(12) United States Patent
Agarwal

(10) Patent No.: US 8,332,333 B2
(45) Date of Patent: Dec. 11, 2012

(54) LEARNING ALGORITHM FOR RANKING ON GRAPH DATA

(75) Inventor: Shivani Agarwal, Waltham, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 603 days.

(21) Appl. No.: 11/975,697

(22) Filed: Oct. 19, 2007

(65) Prior Publication Data

US 2008/0097941 A1 Apr. 24, 2008

Related U.S. Application Data

(60) Provisional application No. 60/853,072, filed on Oct. 19, 2006.

(51) Int. Cl.
*G06F 15/18* (2006.01)
(52) U.S. Cl. ........................................ 706/12
(58) Field of Classification Search ............ None
See application file for complete search history.

(56) References Cited

U.S. PATENT DOCUMENTS

| | | | |
|---|---|---|---|
| 6,556,983 B1 | 4/2003 | Altschuler | |
| 6,799,176 B1* | 9/2004 | Page | 1/1 |
| 7,587,391 B1* | 9/2009 | Bostock et al. | 1/1 |
| 7,689,520 B2* | 3/2010 | Burges et al. | 706/12 |
| 2005/0288868 A1 | 12/2005 | Duffy | |
| 2006/0195406 A1 | 8/2006 | Burges | |
| 2007/0011121 A1* | 1/2007 | Bi et al. | 706/20 |
| 2007/0094171 A1* | 4/2007 | Burges et al. | 706/16 |
| 2007/0185871 A1* | 8/2007 | Canright et al. | 707/7 |
| 2007/0250502 A1* | 10/2007 | Canright et al. | 707/5 |

OTHER PUBLICATIONS

Agarwal, S.; A Study of the Bipartitie Ranking Problem in Machine Learning; Ph.D. Thesis; University of Illinois at Urbana-Champaign (2005); pp. 1-116.*
Zhou and Scholkopf; A regularization framework for learning from graph data; SRL2004: Workshop on Statistical Relational Learning and its Connections to Other Fields (Feb. 22, 2004); pp. 1-6 (132-137).*
Rabitti, F. and Savino, P.; Retrieval of multimedia documents by imprecise query specification; Springer Berlin (1990); pp. 1-16.*
Agarwal, S. and Niyogi, P.; Stability and generalization of bipartite ranking algorithms; Proceedings of the 18th Annual Conference on Learning Theory; Springer (Aug. 11, 2005); pp. 1-15.*
Belkin, Matvveev, & Niyogi; Regularization and semi-supervised learning on large graphs; Proceedings of the 17th Annual Conference on Learning Theory (2004); Springer (Aug. 5, 2004); pp. 1-15.*
Microsoft Computer Dictionary, Fifth Edition (2002); p. 301.*

(Continued)

*Primary Examiner* — Jeffrey A Gaffin
*Assistant Examiner* — Stanley K Hill
(74) *Attorney, Agent, or Firm* — Muirhead & Saturnelli, LLC

(57) ABSTRACT

Described are techniques for ranking a data set of objects. A graph representing the data set is provided. Examples of ranking preferences are provided for a portion of objects in the data set. Each of the examples indicates a ranking of a first object of the portion with respect to a second object of the portion. In accordance with the examples, a function, f, is determined that ranks the objects of the data set. A ranking of the objects of the data set is determined using the function f.

27 Claims, 8 Drawing Sheets

OTHER PUBLICATIONS

Hullermeier et al.; Ranking by Pairwise Comparison: A Note on Risk Minimization; 2004 IEEE International Conference on Fuzzy Systems (2004); pp. 1-6.*

Agarwal, S. et al.; "Generalization Bounds for the Area Under the ROC Curve"; 2005; Journal of Machine Learning Research 6; pp. 393-425.*

Xu, Jun et al.; "Cost-Sensitive Learning of SVM for Ranking"; 2006; Springer-Verlag Berline Heidelberg; Lecture Notes in Computer Science, 2006, vol. 4212/2006; pp. 833-840.*

Cao, Zhe et al.; "Learning to Rank: From Pairwise Approach to Listwise Approach"; Proceedings of the 24th International Conference on Machine Learning; pp. 129-136.*

"Protein ranking: From local to global structure in the protein similarity network", Weston et al., PNAS Apr. 24, 2004, Vo. 101, No. 17, pp. 6559-6563.

"Ranking on Graph Data",and Erratapage, Shivani Agarwal, Proceedings of the $23^{rd}$ International Conference on Machine Learning, Pittsburgh, PA, 2006, Jun. 25, 2006.

* cited by examiner

LEARNING ALGORITHM FOR RANKING ON GRAPH DATA

CROSS-REFERENCE TO RELATED APPLICATIONS

This application claims priority from U.S. Provisional Application No. 60/853,072, filed Oct. 19, 2006, A LEARNING ALGORITHM FOR RANKING ON GRAPH DATA, which is incorporated herein by reference.

BACKGROUND

1. Technical Field

This application generally relates to machine learning, and more particularly to machine learning techniques used in connection with ranking sets of data.

2. Description of Related Art

Data may be stored in an electronic form for use with computerized techniques. A large amount of computerized data used in connection with a variety of different applications presents a challenge for how to locate and organize relevant information. Once a set of relevant data has been determined, a problem exists of how to order or rank the identified relevant data. As an example, a user may perform a search, such as using a search engine for relevant web pages. The query may result in a set of web pages which are relevant to the user's query terms. The user may not simply want a listing of the result set and may want to know what elements of the result set are the most relevant in accordance with the user query. Furthermore, the resulting query set may be large making a task of determining the most relevant information for the particular query more difficult for the user as the size of the resulting query set increases.

Machine learning techniques may be used in connection with ranking data sets such as the foregoing resulting query set. Existing machine learning techniques operate on vector-valued data to learn a ranking function inducing a ranking or ordering. However, input data may not be vector-valued data and, thus, may not utilize existing techniques for ranking.

SUMMARY OF THE INVENTION

In accordance with one aspect of the invention is a method for ranking a data set of objects comprising: providing a graph representing the data set; providing examples of ranking preferences for a portion of objects in the data set, each of the examples indicating a ranking of a first object of the portion with respect to a second object of the portion; determining, in accordance with the examples, a function, f, that ranks the objects of the data set; and determining a ranking of the objects of the data set using the function, f. The function, f, may minimize an objective function. The objective function may be formed using an error term and a regularization term. The error term may include a loss function and may be determined using penalty values associated with the examples. The regularization term may be formed using a regularizer determined from the graph of the input data set and regularization parameter value used to weight the regularization term in accordance with the error term. The graph may include a set of vertices corresponding to the objects, a set of edges where each of the edges represents a similarity between two vertices connected by each edge, and a set of weights where each of the weights is associated with one of the edges and represents a degree of similarity between two vertices connected by the one edge. The graph may be an undirected graph and the objective function may include a regularizer formed using a Laplacian matrix of the graph representing the data set of objects. The objective function may include an error term formed using penalty values associated with the examples and using a convex upper bound of a step-loss function, $l(f:vi, vj)$, wherein, for one of the examples indicating that a vertex vi of the graph is ranked higher than vertex vj, the step-loss function $l(f:vi, vj)$, for the pair of vertices, vi, vj, is 1 if $f(vi)<f(vj)$, ½ if $f(vi)=f(vj)$, or 0 if $f(vi)>f(vj)$. The objective function may use a convex upper bound on the step-loss function of the error term represented as: $l_h (f:vi, vj)=(1-(f(vi)-f(vj)))_+$, where, if $(1-(f(vi)-f(vj)))>0$, then $l_h (f:vi, vj)=(1-(f(vi)-f(vj)))$, and otherwise, $l_h (f:vi, vj)=0$. The graph may be a directed graph and the objective function includes a regularization term formed using a Laplacian of the graph determined using a transitional probability matrix. The data set may be a set of documents. The documents may be ranked in accordance with one or more query terms. The documents may include multimedia documents. The data set may be a set of molecules ranked according to biological activity with respect to a particular target. The molecules may include chemical structures. The graph of the data set may be a data graph, and the examples may be represented as an order graph in which the order graph is a directed graph formed from a subset of vertices of the data graph, edges and weights, each of the edges from a first vertex of the subset to a second vertex of the subset indicating that the first vertex is ranked higher than the second vertex, each of the weights corresponding to one of the edges and indicating a penalty value for improperly ordering the first vertex and the second vertex of the one edge.

In accordance with another aspect of the invention is a method for ranking a data set of objects comprising: providing a graph representing similarity between pairs of the objects of the data set, the graph including vertices corresponding to the objects, the graph including edges, each of the edges between a pair of vertices having a weight corresponding to a similarity measurement between objects that correspond to the pair of vertices; providing examples of ranking preferences for a portion of objects in the data set, each of the examples indicating a ranking of a first object included in the portion with respect to a second object included in the portion; determining, in accordance with the examples, a function, f, that minimizes an objective function, the objective function including an error term and a regularization term, the error term being formed from a loss function and penalty values associated with improperly ranking pairs of objects included in the examples, the regularization term formed using a weighting factor and a regularizer that provides a measurement of how smooth the function f is with respect to ranking a pair of objects in accordance with their respective similarity; and outputting a ranking of the objects in the data set using the function, f. The regularizer may be formed using a Laplacian matrix of the graph. The graph may be a directed graph and the Laplacian matrix may be formed using a transition probability matrix. The graph may be an undirected graph and the Laplacian matrix, L, may be represented as: $L=D^{-1/2}(D-W)D^{-1/2}$, where D is a diagonal matrix and W is an "n×n" matrix, n=a number of vertices in the graph, with entry $W_{ij}=w(vi, vj)$ for all edges $\{vi, vj\}$ of the graph, $W_{ij}=0$ otherwise, $w(vi, vj)$ representing a weight associated with an edge between vertex vi and vertex vj in the graph, and D is a diagonal matrix with entry $D_{ii}=d(vi)$, $w(vi, vj)$ being the weight of the edge between vertices vi and vj of the graph. The regularization term may include a regularizer S(f) represented as: $S(f)=F^T L F$ where L represents the Laplacian matrix of the graph, F is a column vector of ranking function values for each of the vertices in the graph, and $F^T$ is a transpose of the column vector F. The examples of ranking preferences may be specified using one of a real value assigned to each object in the portion or a partitioning of the objects in the portion into a first partition of relevant objects and a second partition of objects which are not relevant. The method may also include preprocessing a first form of the examples of ranking preferences to convert the first form into a second form including pairs of vertices and an associated one of the penalty values with each of the pairs, the penalty value indicating a penalty incurred for misordering vertices of each pair. The data set may be a set formed from webpages, products, or genes.

In accordance with another aspect of the invention is a computer readable medium comprising code stored thereon for ranking a data set of objects, the computer readable medium comprising code for: providing a graph representing similarity between pairs of the objects of the data set, the graph including vertices corresponding to the objects, the graph including edges, each of the edges between a pair of vertices having a weight corresponding to a similarity measurement between objects that correspond to the pair of vertices; providing examples of ranking preferences for a portion of objects in the data set, each of the examples indicating a ranking of a first object included in the portion with respect to a second object included in the portion; determining, in accordance with the examples, a function, f, that minimizes an objective function, the objective function including an error term and a regularization term, the error term being formed from a loss function and penalty values associated with improperly ranking pairs of objects included in the examples, the regularization term formed using a weighting factor and a regularizer that provides a measurement of how smooth the function f is with respect to ranking a pair of objects in accordance with their respective similarity; and outputting a ranking of the objects in the data set using the function, f.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1A:
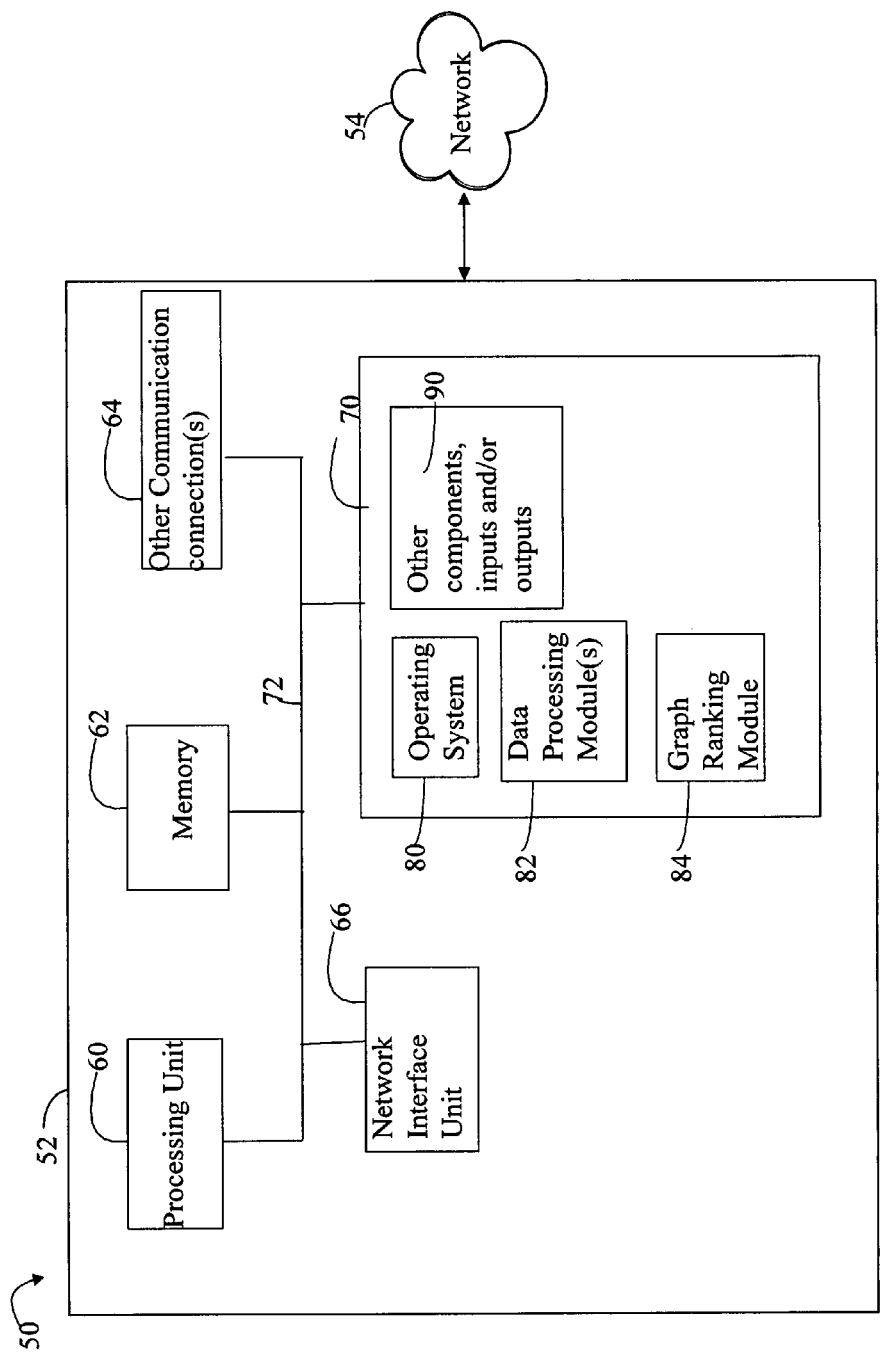
FIG. 1A is an example of an embodiment of a system that may utilize the techniques described herein.

Referring to FIG. 1A, illustrated is an example of a suitable computing environment in which embodiments utilizing the techniques described herein for ranking data may be implemented. The computing environment illustrated in FIG. 1A is only one example of a suitable computing environment and is not intended to suggest any limitation as to the scope of use or functionality of the techniques described herein for ranking an input data set. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1A are a computer 52 and a network 54. The computer 52 may include a standard, commercially-available computer or a special-purpose computer that may be used to execute one or more program modules. Described in more detail elsewhere herein are program modules that may be executed by the computer 52 in connection with ranking an input data set using techniques described herein. The computer 52 may operate standalone as well as in a networked environment and communicate with other computers not shown in FIG. 1A.

It will be appreciated by those skilled in the art that although the computer is shown in the example as communicating in a networked environment, the computer 52 may communicate with other components utilizing different communication mediums. For example, the computer 52 may communicate with one or more components utilizing a network connection, and/or other type of link known in the art including, but not limited to, the Internet, an intranet, or other wireless and/or hardwired connection(s).

Also included in FIG. 1A are an example of components that may be included in a computer 52 as may be used in connection with performing the various embodiments of the techniques described herein. The computer 52 may include one or more processing units 60, memory 62, a network interface unit 66, storage 70, one or more other communication connections 64, and a system bus 72 used to facilitate communications between the components of the computer 52.

Depending on the configuration and type of computer 52, memory 62 may be volatile (such as RAM), non-volatile (such as ROM, flash memory, etc.) or some combination of the two. The computer 52 may also include additional storage (removable and/or non-removable) 70 including, but not limited to, USB devices, magnetic or optical disks, or tape. The storage 70 may include one or more different types of computer-readable media that can be accessed by the computer 52 such as, for example, a hard disk or CD-ROM drive, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by computer 52. Stored on the computer readable media may be computer readable instructions, data structures, program modules and/or other data as may be used in connection with the techniques herein.

The computer 52 may also contain communications connection(s) 64 that allow the computer to communicate with other devices and components such as, by way of example, input devices and output devices. The computer 52 may operate in a networked environment and may connect to the network 54 of FIG. 1A through a network interface unit 66 connected to bus 72.

One or more program modules and/or data files may be included in storage 70. During operation of the computer 52, one or more of these elements included in the storage 70 may also reside in a portion of memory 62, such as, for example, RAM for controlling the operation of the computer 52. The example of FIG. 1A illustrates various components of the computer 52 including an operating system 80, a data processing module 82, a graph ranking module 84, and other components, inputs, and/or outputs 90. The operating system 80 may be any one of a variety of commercially available or proprietary operating systems. The operating system 80, for example, may be loaded into memory in connection with controlling operation of the computer. The modules 82 and 84 may be used in connection with techniques described herein for ranking input data. The foregoing components 82 and 84 included in FIG. 1A, as well as other inputs and outputs, are described in more detail in following paragraphs.

Although the components, such as the different modules 82 and 84, are shown as being included in a single computer system, the components may be included on different computer systems and operate in accordance with the techniques described herein. For example, a module 82 may be included and operate on a first computer. The module 84 may be included and operate on another computer system connected to the first computer, such as through the network 54 as illustrated in FIG. 1A. During operation, the first computer may execute code of the module 82 to generate output that may be optionally used by the module 84 on the other computer system. The foregoing, and other variations of the exemplary embodiments described herein, will be appreciated by those of ordinary skill in the art.

Described herein are techniques that may be used in connection with a machine learning algorithm for ranking an input data set of objects represented as a graph. In connection with ranking, examples of ranking preferences or order relationships among objects of the input data set may be provided. The goal is to learn from the foregoing examples and determine a ranking function that induces an ordering or ranking over the object space of the input data set. In connection with the techniques herein, the input data set may be represented as a graph in which vertices correspond to objects of the input data set and edges represent a similarity between connected objects. The input data set may also be in a different form, such as a vector-based form, which is converted to a graph representation by the data processing module 82 for use with the techniques herein. Preprocessing or conversion may also need to be performed with respect to the initial form of the examples of ranking preferences. As such, the module 82 may also be used to place the examples of ranking preferences in a form for use by the module 84. The graph ranking module 84 may then execute a learning method to determine the ranking function used to rank or order the input data set in accordance with the examples provided. As will be described in more detail in following paragraphs, the techniques herein provide a flexible framework for learning a ranking function on graph data.

In one aspect, the examples may be characterized as training data formed from a portion or subset of the input data set to be ranked. Using the ranking preferences specified for this subset of the input data set, the techniques herein learn a ranking function for use with ranking all objects of the input data set.

The input data set of objects represented as a graph used with the techniques herein may be associated with any of a variety of application domains in which similarities between objects may be characterized as pair-wise connections among graph vertices. Accordingly, the techniques described here may then be used for ranking objects in any one of a variety of different domains. For example, the techniques described herein may be used to rank documents or webpages in an information retrieval application, or to rank chemical compounds or molecules in a drug discovery application, and other areas as described elsewhere herein.

Figure 1B:
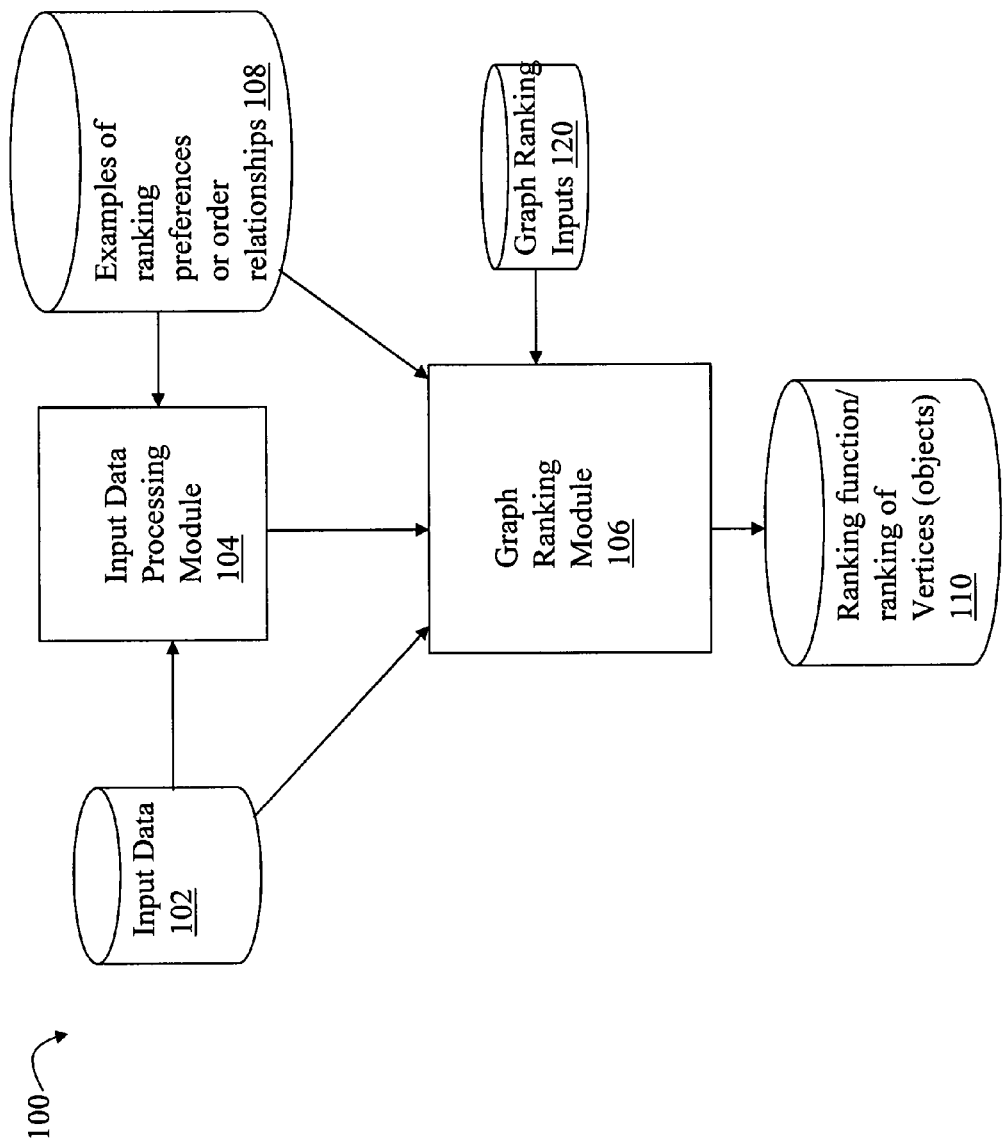
FIG. 1B is an example of functional components that may be used in connection with performing the techniques herein.

Referring to FIG. 1B, shown is an example illustrating components that may be included in one embodiment using the techniques herein. The example 100 includes input data set 102, a data processing module 104, a graph ranking module 106, examples of preference orderings or rankings 108, graph ranking inputs 120, and the output ranking function used to rank vertices or objects 110. The input data set 102 may be represented in the form of a graph as will be described in more detail in following paragraphs. The input data set 102 may also be of a different form, such as in the form of feature vectors or other descriptors. In order for input data set 102 which is not in the proper graph form to be used in connection with the techniques herein, an embodiment may include one or more data processing modules 104 to convert the input data 102 into a representation of a graph. The foregoing converted form may then be used as an input to the graph ranking module 106. One or more data processing modules 104 may also be used to place the examples 108 in a proper form for use by module 106 as described in more detail elsewhere herein. It should be noted that the module(s) 104 may be optionally included in an embodiment.

The examples 108 may indicate examples of order relationships or ranking preferences with respect to a portion of objects from the input data set represented as vertices of the graph representing objects the input data set 102. The examples 108 may include pairs of vertices, (v1, v2), indicating that vertex v1 should be ranked higher than vertex v2. Additionally, for each pair of vertices, (v1, v2), a penalty value may be specified indicating a penalty for misordering the vertices v1 and v2 in the resulting ranking. An embodiment may represent the examples 108 in any one of a variety of different forms. For example, an embodiment may represent the examples 108 using the foregoing pairs of vertices and associating a penalty value with each pair of vertices. An embodiment using the techniques herein may input the examples 108 in the form of a list in which each element of the list is a pair of vertices and a corresponding penalty value. An embodiment may alternatively represent the examples 108 in the form of a directed graph or order graph in which, for a pair of vertices (v1, v2) with a penalty value of P, there is an edge from v1 to v2 having a weight of P. The examples 108, and different ways in which they may be represented and used with the techniques herein, are described in more detail in following paragraphs.

As mentioned above, the examples 108 may not be in the proper or expected form of ranking preferences or pairs so that processing may need to be performed on the examples 108 to place them in the proper form for use by the graph ranking module 106. For example, an embodiment may provide real value or integer value labels for a portion of the objects (vertices) in the input data set, each vertex in the portion having a corresponding one of the value labels. In this example, a higher value label indicates that the corresponding vertex should be ranked higher than other vertices having lower valued labels. The value labels may then be sorted so that the corresponding vertices in the portion have a relative ordering and can be used to determine the examples of ranking preferences where each example specifies an order relationship between a pair of vertices. A penalty value may be associated with each example. The penalty value may be any integer or real value determined in any one of a variety of ways. As an example in connection with the foregoing value labels, a penalty value for a given pair of vertices may be determined as a mathematical difference of the value labels associated with the pair of vertices. As another example, a penalty value may be a real value which is manually or otherwise assigned to each pair of vertices. The foregoing are just a few examples of penalty values that may be selected and used in connection with the techniques herein.

If conversion for the examples 108 is needed, the examples 108 may be initially processed by the data processing module 104 to place them in a proper form for use by the module 106.

The graph ranking module 106 takes as inputs the examples 108 and the input data set 102, or a converted form thereof as output by the module 104. The graph ranking inputs 120 are also input to the processor 106. The graph ranking inputs 120 are inputs to the graph ranking technique described herein in more detail and may be selected for use in an embodiment. The graph ranking module 106 may be implemented using hardware and/or software. In one embodiment, the graph ranking module 106 may be a computer program which is executed on a computer to perform processing steps described herein. As an output, the graph ranking module 106 generates a ranking function/ranking of vertices 110. The ranking function may be used to rank the vertices of the graph representing objects of the input data set. In one embodiment, the ranking may be represented as a real value associated with each object such that the higher the value that is associated with an object, the higher the ranking of the object.

In one aspect, the example 100 may represent functional components performing the techniques herein and the processing may actually be implemented using multiple software and/or hardware components.

As will be described in following paragraphs, the techniques herein may be used in connection with an input data set represented as undirected graph or a directed graph. An example utilizing an input data set represented as an undirected graph used in connection with the techniques herein will first be described.

Figure 2:
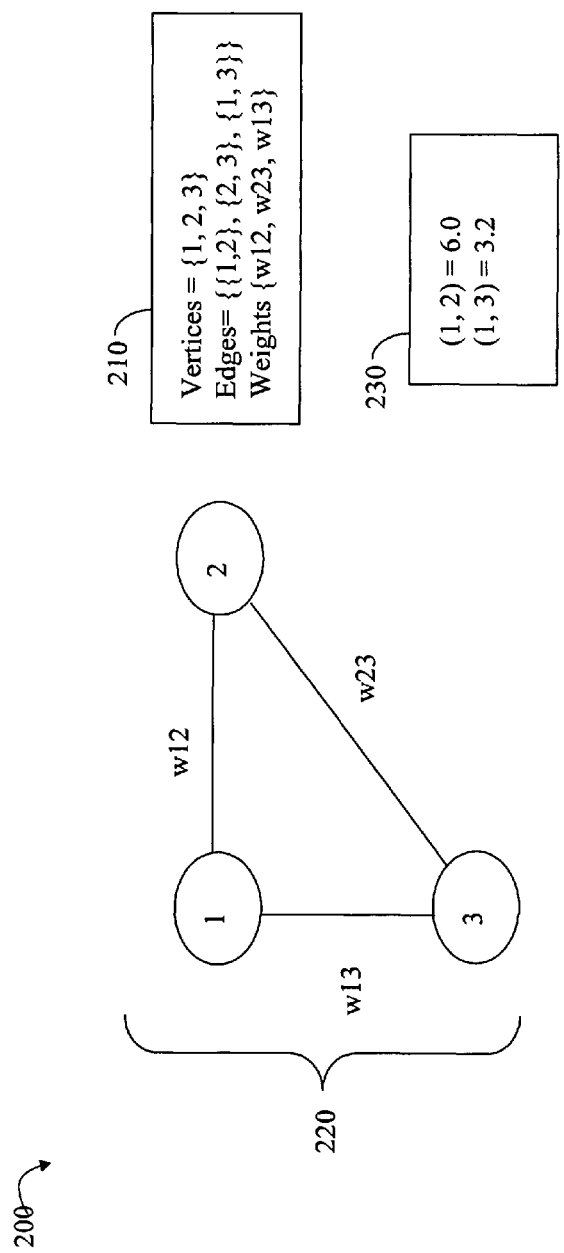
FIGS. 2-5 are examples illustrating use of the techniques herein.

Referring to FIG. 2, shown is a example of a graph that may represent an input data set. Formally, the input data set may be represented as a weighted graph $G=(V, E, w)$, where V is the set of vertices in which each vertex corresponds to an object in the input data set being ranked, E is a set of edges connecting related vertices, and w is a weight function encoding connection strengths. Each edge may have an associated weight representing the strength of the connection between the two vertices of the edge. The graph representing the input data set may be characterized as a similarity graph in which an edge exists between any two nodes which are similar and the weight associated with the edge corresponds to the degree of similarity between the two connected nodes. With reference to FIG. 2, shown is an example of a graph illustrated by element 220 and defined as by element 210 with 3 vertices, and 3 edges with corresponding weights. The weight may be determined in accordance with a weight function for the particular similarity represented. The similarity between 2 vertices may be based on one or more properties or attributes of the objects of the input data set. The weight may vary with the types of objects represented in the input data set.

As an example, the input data set may be molecules included in a database. Each vertex in the graph may correspond to a molecule in the database. An edge may exist between any two vertices (molecules) which are similar. The similarity represented by edges and associated weights the graph may be any of a variety of similarities with respect to the objects represented. For example, the edges may have weights determined in accordance with structural similarity between the molecules represented as vertices in the graph. As another example, the input data set may be documents. Each vertex in the graph may correspond to a document. Documents may have a similarity function used to determine weights based on the occurrence and associated frequency of particular words in any 2 documents.

Also included in FIG. 2 are examples of ranking preferences or order relationships 230. In this example, the element 230 includes 2 ranking preferences and associated penalty values. The first preference indicates that vertex 1 should be ranked above vertex 2 and the associated penalty for misordering is 6.0. The second preference indicates that vertex 1 should be ranked above vertex 3 and the associated penalty for misordering is 3.2. The relative preferences indicate that the penalty or cost for misordering (1, 2) is roughly twice as great as the penalty or cost for misordering (1,3).

For ranking purposes, different ranking preferences may be specified for different applications or uses of the same input data set. In other words, the ranking preferences or order relationships of 230 may be varied for the particular application while using the same weights and graph representation as in 210 and 220. With reference to vertices that represent molecules, the ranking preferences may be varied with the particular application. For example, the similarity function may determine an edge weight between two vertices based on the structural similarity between the molecules corresponding to the two vertices. A first set of ranking preferences may be used for determining relevance or success of the molecules with respect to treating one disease. A second different set of ranking preferences may be used for determining relevance or success of the molecules with respect to treating a second disease different from the first disease. Each of the first and second set of ranking preferences may be used in connection with the same input data set and same graph representation.

As another example, the input data set may be a set of documents as described above. A similarity function used to determine weights for the graph representation of the documents may be based on the occurrence and associated frequency of particular words in any 2 documents. The ranking preferences or order relationships may indicate that one document is better than another for a particular purpose such as, for example, related to a particular topic of interest. A first set of ranking preferences may indicate relevance of the documents with respect to each other for the topic of airplanes. A second set of ranking preferences may indicate relevance of the same documents with respect to each other for a different topic, such as motor bikes.

As described herein, the ranking preferences may be in any one of a variety of different forms. The examples 230 of FIG. 2 illustrate one particular form in which each pair of vertices is associated with a real valued quantity (e.g., a penalty value that is a real value). As another form, the ranking preferences may be specified as a discrete or binary partitioning of the objects of the input data set by indicating which objects in a given subset or portion of objects of the input data set are considered relevant. In other words, there may not be a degree of relevance but only that an object is relevant, or is not relevant. In this case, the penalty value for a pair of vertices, (v1, v2), may be =1 if v1 is relevant and v2 is not; =−1 if v1 is not relevant and v2 is relevant; and otherwise=0.

As described above, the ranking preferences may be represented by specifying a real or integer value label for particular objects in the input data set in which a higher value indicates that the associated object should be ranked higher than other objects have a lower associated real value. As an example in which the objects are different molecules, the ranking preferences may indicate a ranking or relevance of a molecule to a particular disease based on the binding affinity of that molecule to receptors for the particular disease. The higher the value associated with the molecule, the higher the relative binding affinity with respect to other molecules having lower associated values. In such an embodiment, the penalty value may be a difference between the binding affinity values. The penalty value may be determined using any one of a variety of different ways in accordance with the particular application.

Figure 3:
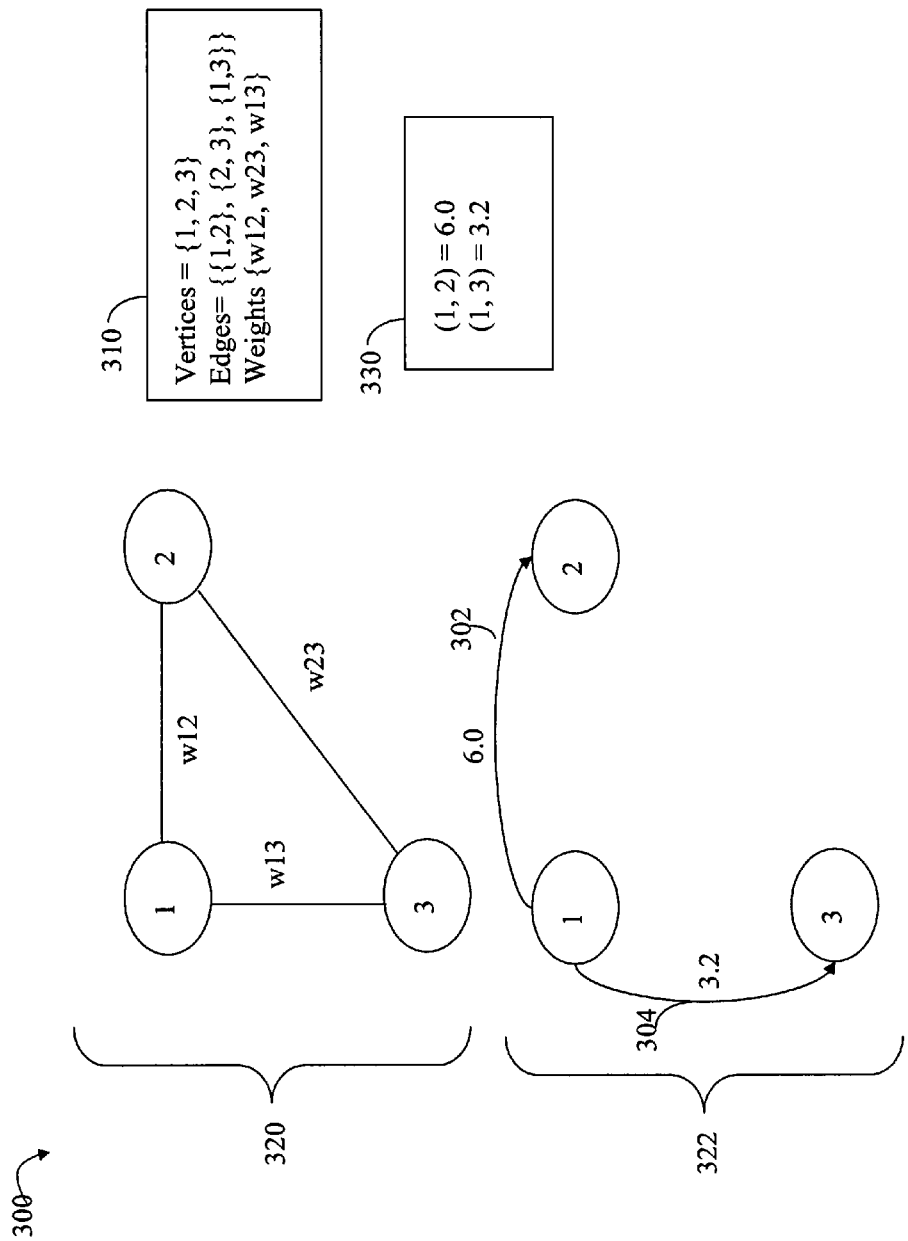

As mentioned above, the examples of ranking preferences may also be represented as a directed graph of its own referred to above as an order graph as will now be illustrated in FIG. 3.

Referring to FIG. 3, shown is an illustration of the input data set represented as a graph 320 from FIG. 2 with the examples of ranking preferences also represented as a directed graph 322. The graph 320 is the same as 220 of FIG. 2. In connection with the illustration 300, the examples of ranking preferences may be represented in a directed graph 322 with edges 302 and 304. The inputs for use with the techniques herein in the illustration 300 may include the graph 320 representing the input data set from 220 as an undirected graph with the addition of directed graph 322 including edges 302 and 304 corresponding to the examples of ranking preferences 330. The graph 322 includes the same vertices as the graph 320 and the edges between pairs of vertices are directed edges with weights representing the penalty values.

In connection with the techniques herein, the examples of ranking preferences may be in the form as in connection with FIG. 2 (e.g., pairs of vertices with penalty values 230), FIG. 3 (e.g., directed graph 322), or any one of a variety of other forms.

In connection with the techniques herein, the goal is to learn a ranking function, f, in accordance with the specified graph, G, and examples of ranking preferences or order relationships denoted $\Gamma$. A ranking function f assigns to each vertex vi in G a value f(vi), such that these values define a ranking of the vertices. For example, f may be a permutation in which case f(vi) is an integer denoting the rank of vi. As another example, f may be a real-valued function that assigns a real-valued score f(vi) to vi in which case the vertices are ranked in descending order of the scores. As yet another example, f may be a multi-valued function in which case some appropriate method may be used to derive a ranking from f. To illustrate the techniques herein, described are examples in which f is a real-valued ranking function although the techniques herein apply more generally to learning other forms of ranking functions as well.

Formally, the penalty value for misordering a pair of vertices, v1, v2 described above may be represented as $\tau(v1, v2)$. Since V includes a set of finite and known vertices and the goal is to learn a ranking function over the set V, the formulation of the problem of learning a ranking function on the graph G falls under the setting of transductive learning. The ranking function, f, maps a vertex from V to a real number and may be represented as f: V→R, where R is the set of real numbers. Since |V|=n, (n=number of vertices in the graph G), any ranking function, f, can be represented as a column vector f∈R" with the ith element fi=f(vi) for vertex vi.

In following paragraphs, described is a technique which utilizes a regularization-based algorithmic framework for learning a ranking function, f, based on G and $\Gamma$. The techniques herein minimize a combination of an error term which measures the empirical ranking error of the learned function, f, with respect to the given examples of ranking preferences, $\Gamma$, and a regularization term which measures smoothness of the learned function, f, with respect to the graph, G. Described in following paragraphs are particular instances of the error term and regularization term for purposes of illustration. It will be appreciated by those skilled in the art that other selections may be used in connection with an error term and/or regularization term with the techniques herein. A good ranking function is one that makes few ranking mistakes. If ties are broken at random, the expected ranking loss incurred by a function f: V→R on a pair of vertices (vi,vj)∈$\Sigma$, where $\Sigma$ represents the pairs of vertices of V from the graph, G, used in the examples of ranking preferences, may be represented as:

$$\tau(vi,vj) * l(f:vi,vj)$$

where l(f:vi, vj), a loss function, may be characterized as a loss equal to $$\begin{cases} 1 & \text{if } f(vi) < f(vj), \\ \frac{1}{2} & \text{if } f(vi) = f(vj), \text{ or} \\ 0 & \text{if } f(vi) > f(vj) \end{cases} \quad \text{EQUATION A1}$$

It should be noted that the EQUATION A1 represents only one particular selection of a loss function, l(f:vi, vj), that may be used in connection with the techniques herein. EQUATION A1 may be characterized as a step-function.

The empirical ranking error, ER, of f with respect to the examples of ranking preferences $\Gamma$ can be expressed as $$ER(f;\Gamma) = \frac{1}{|\Sigma|} \sum_{(vi,vj) \in \Sigma} \tau(vi, vj) * l(f:vi, vj) \quad \text{EQUATION A}$$

where |$\Sigma$| represents the number of examples specified in the ranking preferences. l(f:vi, vj) may be the loss function as in EQUATION A1 or another loss function.

It should be noted that EQUATION A represents a generalization of the ranking error or ranking error term, ER that may be used in connection with the techniques herein. Any one of a variety of different loss functions may be selected for use with EQUATION A in an embodiment. Another generalization of ER for which a loss function may be selected may be represented as:

$$ER(f;\Gamma) = \frac{1}{|\Sigma|} \sum_{(vi,vj) \in \Sigma} l(f:vi, vj, \tau(vi, vj)) \quad \text{EQUATION A2}$$

In EQUATION A2, the penalty value $\tau(vi, vj)$ may be an input to the loss function so that the loss function has dependent variables vi, vj and $\tau(vi, vj)$. EQUATION A2 is in contrast to EQUATION A1 in which the error is determined as a product of $\tau(vi, vj)$ with the loss function. EQUATION A2 is another way of representing how ER may be expressed and determined in an embodiment with any selected loss function. In following paragraphs and examples herein, the form of EQUATION A1 may be utilized. However, it should be noted that an embodiment may use an ER for a selected loss function, l, with EQUATION A2 with the techniques herein.

The techniques herein minimize regularized versions of the above empirical ranking error with respect to the examples of ranking preferences. The regularizers (as included in a regularization term below) encourage smoothness of the learned ranking function, f, with respect to the graph, G, of the input data set. A measurement of smoothness of a ranking function, f, with respect to the graph, G, refers to how well the function, f, performs with respect to the following property: if two vertices, v1 and v2, have a high degree of similarity (e.g., high weight for edge in graph G between v1 and v2), the function values f(v1) and f(v2) assigned by the ranking function f to the vertices v1 and v2 should not be very different. A regularizer that encourages smoothness in the foregoing sense by penalizing functions for not being smooth. That is, the regularizer penalizes functions that assign differing values to vertices that are closely related. The penalty it assigns is higher for pairs of vertices which are more closely related, in other words, for which the weight of the edge connecting the vertices is higher.

In connection with an undirected graph G, the edges E consist of unordered pairs of vertices in V, for example, as illustrated in FIGS. 2 and 3. As described above, the goal of the technique herein is to find a ranking function f: V→R that minimizes a suitably regularized version of the empirical ranking error term ER as represented in EQUATION A with respect to the examples of ranking preferences, Γ. In other words, the ranking function, f, minimizes an objective function that may be characterized as a combination of ER and a regularization term that penalizes functions for not being smooth.

In an embodiment which uses a loss function as in EQUATION A1, minimizing the objective function that involves ER is an NP-hard problem since ER is a weighted sum of terms comprising the step-function ranking loss l(f:vi, vj) described above for various pairs of vertices, vi, vj. Different techniques may be used to reduce the computational complexity of ER. In one embodiment, a convex upper bound on the ER may be utilized such as, for example, a convex upper bound obtained by using the hinge ranking loss function. The following convex loss may be used which is an upper bound on l(f:vi, vj):

$$l_h(f:vi, vj) = (1 - (f(vi) - f(vj)))_+ \quad \text{EQUATION B}$$

where a+=a if a>0, and a+=0 otherwise, where "a" represents the value determined in EQUATION B. In other words, if $(1-(f(vi)-f(vj)))>0$, then $l_h$ (f:vi, vj)=(1−(f(vi)−f(vj))), and otherwise, $l_h$ (f:vi, vj)=0. $l_h$ in EQUATION B may be referred to as the hinge ranking loss. Using $l_h$ as defined in EQUATION B, the following empirical $l_h$ error term may now be defined which is convex in f and specifies an upper bounds for ER(f; Γ):

$$ER1_h(f;\Gamma) = \frac{1}{|\Sigma|} \sum_{(vi,vj) \in \Sigma} \tau(vi, vj) * l_h(f:vi, vj) \quad \text{EQUATION C}$$

As a generalization of what is illustrated in EQUATION C, a goal of the techniques herein is to minimize a regularized version of ER(f; Γ) for some selected loss function. EQUATION C represents one particular instance of an error term ER $l_h$(f; Γ) when the selected loss function is the hinge ranking loss function. In other words, when the selected loss function is the hinge ranking loss function, the techniques herein may be used to find a ranking function, f, for a given G and Γ which solves the following optimization problem for the objective function formed using a selected error term and regularizer. The techniques herein may be used to find the ranking function, f, that minimizes the following objective function comprising an error term based on ER, a regularization term using a suitable regularizer, S(f), and an appropriate regularization parameter λ>0:

$$\min f: V \to R\{ER\; l_h(f;\Gamma) + \lambda S(f)\} \quad \text{EQUATION D}$$

In accordance with EQUATION D, a regularizer S(f) may be selected for use with the techniques herein. As described above, a suitable measure of regularization on ranking functions may be characterized as a measure of smoothness with respect to the graph G. A good selection for a ranking function f is one whose value does not vary rapidly across vertices that are closely related or similar.

With reference to FIG. 1B, the graph ranking module 106 determines the ranking function f that minimizes the objective function of EQUATION D (e.g., determines a ranking function f that minimizes a combination of the error term including ER and a regularization term including S(f)). The graph ranking inputs 120 may be the error term ER $l_h$ (f; Γ), a selected regularizer, S(f), and a value for λ. λ may be characterized as a weighting factor for weighting terms of EQUATION D (e.g., weighting the regularizer with respect to the error term in the objective function). It should be noted that EQUATION D utilizes the selected loss function of EQUATION B. However, an embodiment may also use an error term based on a different loss function.

Based on the foregoing, the graph ranking inputs 120 may be characterized as elements selected in a particular embodiment used in forming the objective function. The graph ranking inputs 120 may be embedded in the coding of software used to implement the techniques herein. Alternatively, an embodiment may allow the graph ranking inputs 120 to be specified as configurable options or otherwise obtained as inputs for use by the graph ranking module 106.

In EQUATION D, the error term ER $l_h$ (f; Γ) may be formed using the penalty values and the examples of ranking preferences 108, and the regularizer S(f) may be formed using the graph G representing the input data set (e.g., the similarity graph). An embodiment may select any one of a variety of different error terms and regularizers which will determine the complexity of the objective function and optimization problem. In one embodiment as selected in accordance EQUATION D, the error term selected may be the hinge ranking loss function of EQUATION B. What will now be described is an example illustrating a selection of a regularizer for use with the foregoing error term using the hinge ranking loss function.

In one embodiment, a regularizer may be selected and written in terms of a Laplacian matrix L of the input data graph G representing the similarity between vertices. It should be noted that an embodiment may select other regularizers than as described herein. The Laplacian is defined as follows: if W, an adjacency matrix, is defined to be an "n×n" matrix, n=number of vertices in V, with Wij=w(vi, vj) for all edges {vi, vj} belonging to E and Wij=0 otherwise, and D is a diagonal matrix with Dii=d(vi), w(vi, vj) being the weight of the edge between vertices vi and vj, then:

$$L = D^{-\frac{1}{2}}(D - W)D^{-\frac{1}{2}} \quad \text{EQUATION E}$$

where $$d(vi) = \sum_{j:\{vi,vj\} \in E} w(vi, vj)$$

The regularizer S(f) may then be represented as follows:

$$S(f) = F^T L F \quad \text{EQUATION F}$$

where L represents the Laplacian matrix as in EQUATION E, F is a column vector of ranking function values for each of the vertices in V for the graph G, and $F^T$ is a transpose of the column vector F, or a row vector, of the ranking function values from F.

Figure 4:
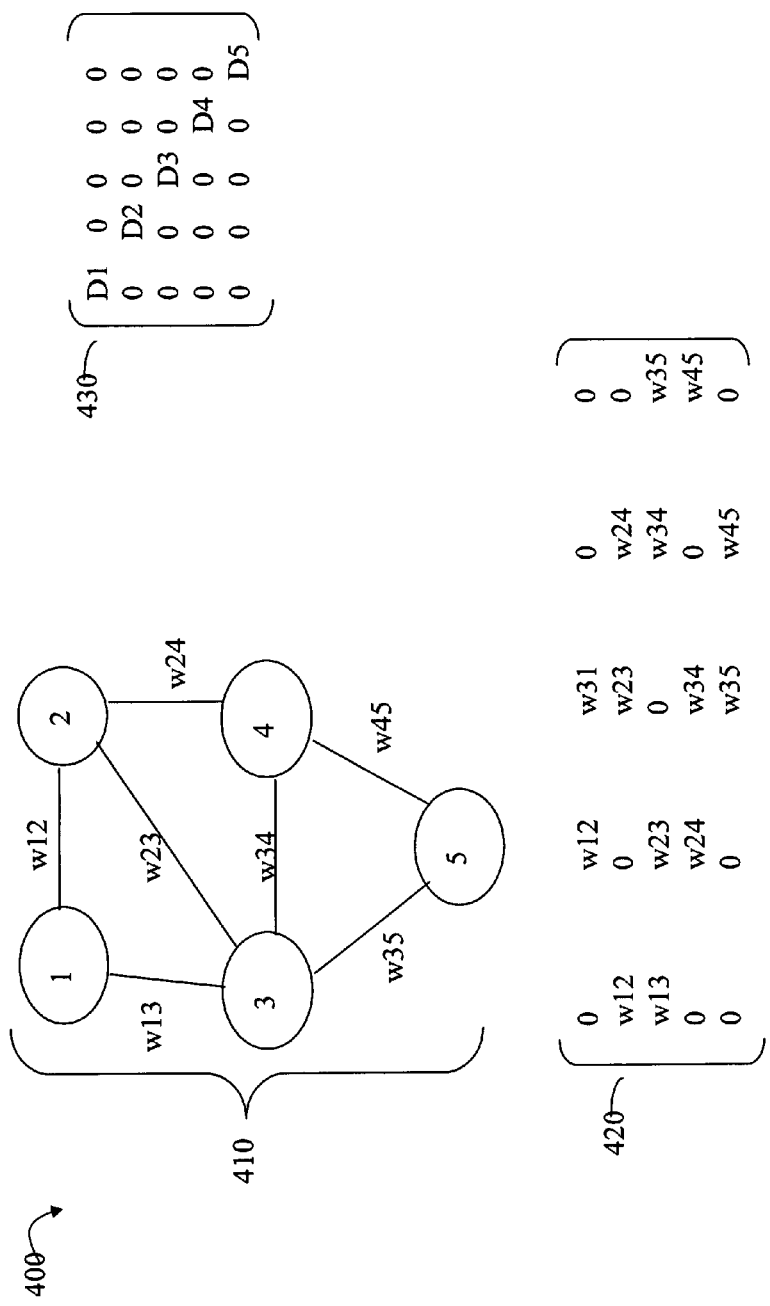

As an example illustrating determination of a regularizer in accordance with EQUATIONS E and F, reference is made to the example graph G of FIG. 4. In the example 400, a graph 410 is illustrated having 5 vertices. The graph 410 may represent objects of an input data set being ranked using the techniques herein. The edge weights in 410 are indicated above the corresponding edges. For example, the weight of the edge between vertices 1 and 2 is indicated as "w12" representing the similarity between objects corresponding to vertices 1 and 2, the weight of the edge between vertices 2 and 3 is indicated as "w23" representing the similarity between objects corresponding to vertices 2 and 3, and so on. Using the graph G 410 of FIG. 4, the adjacency matrix, W, is a 5×5 matrix represented as in 420 and the diagonal matrix D as in 430. In D, Dii is the sum of all edge weights connected to vertex i so that only the diagonals of the matrix can have a non-zero value with zeroes for non-diagonal entries in the matrix D. The Laplacian of the graph 410 may be determined using matrix algebra with EQUATION E above and the regularizer S(f) may then be determined using EQUATION F. Substituting into EQUATION D with the regularizer of EQUATION F as may be in one embodiment using the hinge loss function in connection with the error term and the Laplacian matrix of the graph G, the following objective function may be represented:

$$\min f: V \to R\{ER\, l_h(f;\Gamma) + \lambda F^T LF\} \qquad \text{EQUATION G}$$

Thus, the graph ranking module 106 of FIG. 1B may perform processing for learning from a graph, G, and examples of ranking preferences Γ, a ranking function, f, by solving the optimization problem of EQUATION G (i.e., find a ranking function f that minimizes the objective function of EQUATION G using an appropriate optimization method).

The above EQUATION G can be solved by reduction to a convex quadratic program in a manner similar to that as performed in connection with support vector machines (SVMs). Introducing a slack variable $\epsilon_{ij}$ for each ordered pair of vertices (vi, vj) belonging to the set of edges E of the graph G, EQUATION G can be rewritten as:

$$\min f \in R^n \left\{ \frac{1}{2} F^T LF + C \sum_{(vi,vj) \in \Sigma} \tau(vi, vj) * \varepsilon ij \right\} \qquad \text{EQUATION H}$$

subject to fi−fj≧1−$\epsilon$ij, for all (vi, vj) belonging to Σ, the examples of ranking preferences, and $\epsilon$ij≧0, for all (vi, vj) belonging to Σ, where $$C = \frac{1}{2\lambda |\Sigma|}, |\Sigma|$$

representing the number of examples of ranking preferences. On introducing Lagrange multipliers αij and βij for the above inequalities and formulating the Lagrangian dual, the above problem further reduces to the following convex quadratic program:

$$\min\{\alpha ij\} \left\{ \frac{1}{2} \sum_{(vi,vj) \in \Sigma} \sum_{(vk,vl) \in \Sigma} \alpha ij \alpha kl \phi_{ijkl} - \sum_{(vi,vj) \in \Sigma} \alpha ij \right\} \qquad \text{EQUATION I}$$

subject to

0≦αij≦Cτ(vi, vj), for all (vi, vj) belonging to Σ, where $\phi_{ijkl}$=Lik⁺−Ljk⁺−Lil⁺+Ljl⁺

In the foregoing, Lij⁺ denotes the (i,j)th element of L⁺, the pseudo inverse of L. The Laplacian L is known to be positive semidefinite and not positive definite meaning that L has a zero eigen value and is singular, and thus, the need for the pseudo inverse. A pseudo inverse A⁺ of a matrix A may be characterized as a generalization of the inverse and exists for any (m,n) matrix includes singular square matrices. For any matrix A whose entries are real numbers, the pseudo inverse A⁺ may be defined as the unique matrix satisfying the following criteria:

(1) AA⁺A=A;
(2) A⁺AA⁺=A⁺;
(3) (AA⁺)$^T$=AA⁺; and
(4) (A⁺A)$^T$=A⁺A, where M⁺ denotes the transpose of a matrix M.

Solving the quadratic program gives values α ij that minimize the objective function in EQUATION I above subject to the given constraints. These values of α ij are then used to construct the function, f, as:

$$f<G,\Gamma>=L^+(\alpha^+ - \alpha^-),$$

where α⁺ and α⁻ belong to R$^n$ are given by:

$$\alpha i^+ = \sum_{j:(vi,vj)\in\Sigma} \alpha ij, \text{ and } \alpha i^- = \sum_{j:(vj,vi)\in\Sigma} \alpha ji$$

Using the particular error term and regularizer as described above, solving the objective function may be reduced to a convex quadratic programming problem for finding a ranking function f that minimizes EQUATION I. In other words, for the exemplary selected error term and regularizer above, the optimization problem may be reduced to a convex quadratic programming problem for which known methods exist for solving and finding the function f. For example, a software package of routines such as MATLAB may be utilized to solve the foregoing convex quadratic program of EQUATION I by determining the ranking function f which minimizes the objective function of EQUATION I. In the event a different error term and/or regularizer is selected, the optimization problem may reduce to the same or another type of problem for which known methods exists for solving. For example, if a least squares-based error term is used along with the regularizer as described above using the Laplacian matrix for G, the optimization problem can be reduced to solving a system of linear equations solvable using known methods.

It should be noted that in EQUATION F, the Laplacian L may be the normalized Laplacian or an unnormalized Laplacian. In an embodiment in which the Laplacian of the input data set graph G is an unnormalized Laplacian, the regularizer of EQUATION F may be equivalently represents as:

$$\sum_{(i,j)\in\Sigma} Wij * (f(i) - f(j))^2$$

where Wij is the weight of the edge from the graph G between vertices i and j, f(i) represents the ranking function, f, evaluated for vertex i, and f(j) represents the ranking function, f, evaluated for vertex j.

As another example of a loss function that may be used in connection with an error term, an embodiment may specify examples of ranking preferences for pairs of vertices, v1, v2, as described above. The penalty value τ for (v1,v2) may be determined using any one of the ways described herein as well as others. In this example, the loss function LOSS may be expressed as:

LOSS(f:vi,vj,τ(vi,vj))=|τ(vi,vj)−(f(vi)−f(vj))|.   EQUATION J

The LOSS function of EQUATION J may be used as a particular instance of the error term ER having a general form from EQUATION A2, for example, rather than the hinge loss function of EQUATION B used with the general form of the error term ER from EQUATION A. Using the LOSS function from EQUATION J, the empirical error term ER may then be expressed as a particular instance of the error term ER of EQUATION A2 as:

$$ER\ \text{LOSS}(f;\Gamma) = \frac{1}{|\Sigma|} \sum_{(vi,vj)\in\Sigma} \text{LOSS}(f: vi, vj, \tau(vi, vj))$$   EQUATION K The optimization problem that may be solved using the techniques herein finds a ranking function, f, minimizing the following objective function:

min f: V→R{ER LOSS(f;Γ)+λS(f)}   EQUATION L for some selected regularizer S(f) and value for λ. If the graph G is an undirected graph, S(f) may be expressed using the Laplacian matrix for G as described above or some other suitable regularizer. Depending on the resulting complexity of EQUATION L, different known methods may be used to solve the optimization problem (exactly or approximately) as described herein. Furthermore, different techniques may be used to reduce the complexity of EQUATION L, or terms therein.

What will now be described is use of the techniques herein in connection with directed graphs. Directed graphs may be defined as described herein in connection with undirected graphs with the difference that the edges, E, of the graph, G, are ordered pairs of vertices in V. The goal for directed graphs is the same as with undirected graphs. For example, in connection with the example illustration using the hinge loss function for the error term of EQUATION D above, the goal is to find a function f: V→R that minimizes a suitably regularized convex upper bound on the empirical ranking error with respect to the examples of ranking preferences, Γ. In other words, as with undirected graphs, the goal is to minimize a combination of a ranking error term and a graph-based regularizer (e.g., regularizer determined with respect to a graph G of the input data set). The ranking error term may be selected as with undirected graphs. In the case with directed graphs representing the input data set where a Laplacian-based regularizer is selected, the regularizer is formed differently than if the input data set is represented using an undirected graph. How the regularizer is formed for use with directed graphs and undirected graphs varies with the particular regularizer selected.

Figure 5:
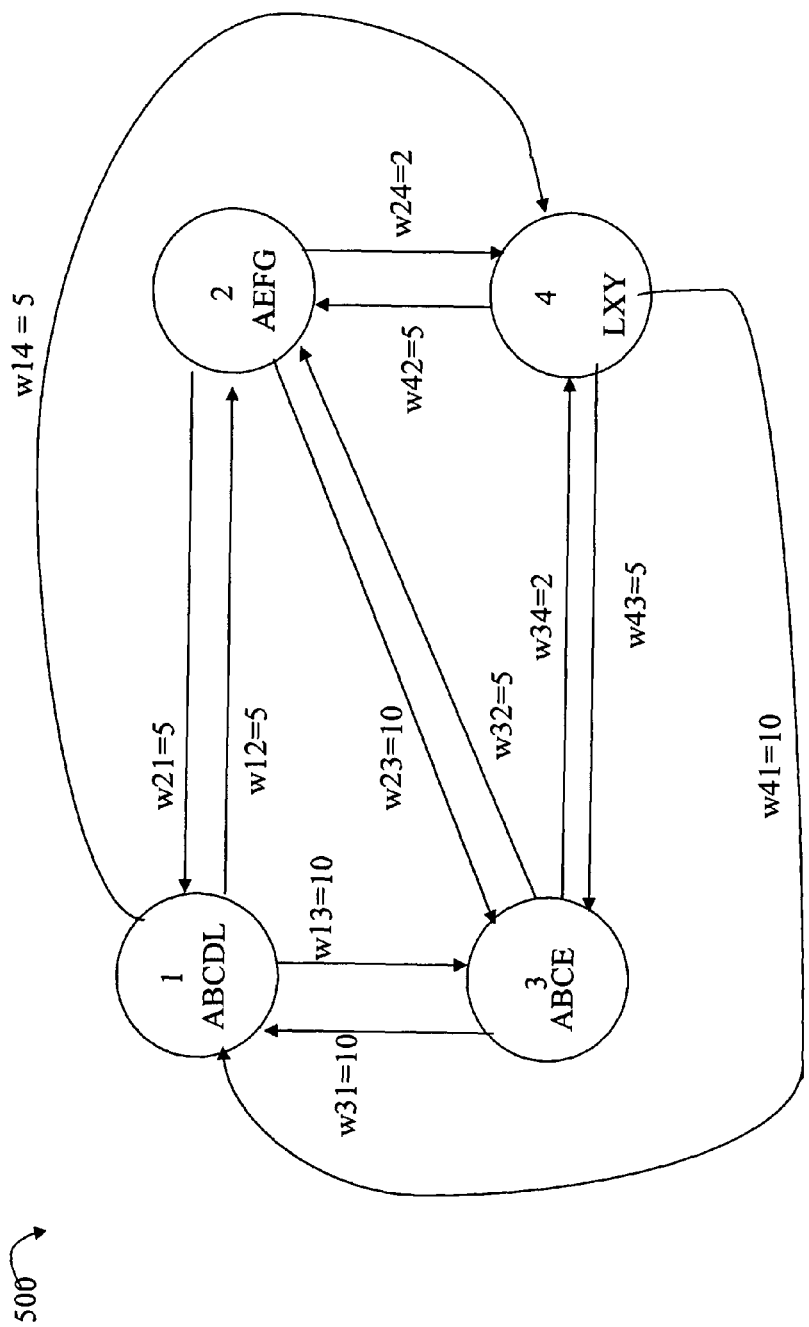

Referring to FIG. 5, shown is an example representation of a directed graph, G, of an input data set. In this example, the graph, G, has 4 nodes with associated directed edges and weights (denoted Wij over edge from vertex i to vertex j) as indicated in 500. A directed graph may be used in an embodiment in which the similarity measurement represented by an edge from v1 to v2 is not the same as the similarity measurement represented by the edge from v2 to v1. As an example, reference is made to FIG. 5 in which each vertex has a set of properties or attributes. As illustrated in the example 500, vertex 1 has attributes ABCDL, vertex 2 has attributes AEFG, vertex 3 has attributed ABCE, and vertex 4 has attributes LXY. A similarity function may be defined to assign a weight to the edge from a vertex i to a vertex j of G as follows:

edge weight=10 if the vertex j has the most attribute matches with attributes of vertex i, for all vertices of G, edge weight=5 if the vertex j has the second highest number of attribute matches with attributes of vertex i, for all vertices of G, or edge weight=2 if the vertex j has the third highest number of attribute matches with attributes of vertex i, for all vertices of G.

If, for a vertex i, there are two j vertices having a same number of matches when comparing attributes, the two vertices have the same edge weight in accordance with the foregoing.

With reference to the example of FIG. 5 and the above-referenced similarity function, the number of matches and edge weights are as follows:

| vertex i | vertex j | no. attribute matches | edge weight from i to j |
|---|---|---|---|
| 1 | 2 | 1 (A) | 5 |
|   | 3 | 3 (ABC) | 10 |
|   | 4 | 1 (L) | 5 |
| 2 | 1 | 1 (A) | 5 |
|   | 3 | 2 (AE) | 10 |
|   | 4 | 0 | 2 |
| 3 | 1 | 3 (ABC) | 10 |
|   | 2 | 2 (AE) | 5 |
|   | 4 | 0 | 2 |
| 4 | 1 | 1 (L) | 10 |
|   | 2 | 0 | 5 |
|   | 3 | 0 | 5 |

The foregoing is one example use of a directed graph, G, to represent an input data set in connection with the techniques herein.

Depending on the selection of the regularizer used in an objective function, the regularizer may be expressed differently when a graph G is a directed graph rather than an undirected graph. As an example, reference is made to EQUATION D in which the error term is used as from EQUATION C. The same error term may be selected for use when G is a directed or an undirected graph. However, the Laplacian of the graph G is constructed differently for directed graphs than with undirected graphs as described above. For directed graphs, the Laplacian L of the graph G is defined in terms of a random walk on the directed graph as will now be described.

Given the weighted directed graph, G, let $d^+$: V→R$^+$∪{0} be the out-degree function of G defined as:

$$d^+(vi) = \sum_{(vi,vj)\in E} w(vi, vj)$$

In other words, the out degree function of a vertex, vi, represents the sum of the edge weights, w, for those outgoing edges from vi to other vertices in the graph G. If the directed graph G is strongly connected and aperiodic, the random walk of G may be considered with the transition probability matrix P defined as:

Pij=w(vi,vj)/d$^+$(vi), if (vi,vj) belongs to E, the set of edges of the graph G or, 0 otherwise.

A directed graph is strongly connected if, for every pair of vertices u and v, there is a path from u to v and path from v to u. A directed graph is aperiodic if there is no integer k>1 that divides the length of every cycle of the graph. In other words, a graph is aperiodic if the greatest common divisor of the lengths of its cycles is one. The greatest common divisor for a graph G is called the period of G.

The above random walk has a unique stationary distribution $\pi: V \rightarrow (0, 1]$, and the Laplacian L of G may be defined as:

$$L = I - \frac{\prod^{\frac{1}{2}} P \prod^{-\frac{1}{2}} + \prod^{-\frac{1}{2}} P^T \prod^{\frac{1}{2}}}{2} \quad \text{EQUATION M}$$

where $\Pi$ is a diagonal matrix with $\Pi ii = \pi(vi)$. In the case when G is not strongly connected and aperiodic, a teleporting random walk may be utilized rather than the foregoing random walk which allows one to walk uniformly to a random vertex with some small probability $\eta$. The teleporting random walk may be described as follows when at a current vertex u with $d^+(u) > 0$ (i.e., there are outgoing edges for the current vertex u). The next step in the teleporting random walk proceeds as follows: (1) with probability $1-\eta$, jump to a vertex chosen uniformly at random over the entire set of vertices excluding u; and (2) with probability $\eta$ $w([u,v])/d^+(u)$, jump to a vertex v adjacent from u, where $w[u,v]$ is the weight of the edge from u to v. If the current vertex u has $d^+(u)=0$ (i.e., no outgoing edges from u to another vertex), jump to a vertex chosen uniformly at random over all vertices excluding u.

The probability transition matrix $P^{(\eta)}$ for a teleporting random walk may be represented as:

$$Pij^{(\eta)} = (1 - \eta)Pij + \eta \frac{1}{n-1}(\text{matrix } 1 - I) \text{ if } d^+(vi) > 0;$$

$$\text{and is } \frac{1}{n-1}(1 - I) \text{ otherwise,}$$

where "matrix1" is an "n×n" matrix of all ones and I is the "n×n" identity matrix. The foregoing teleporting random walk converges to a unique and positive stationary distribution so that Laplacian L for a general directed graph can be defined as in EQUATION M using $P^{(\eta)}$ and the corresponding stationary distribution in place of P and $\Pi$. The foregoing Laplacian matrix L for a directed graph may be used in the same way as the Laplacian L is for undirected graphs described above to define a regularizer S(f) as in EQUATION F above. Thus, the framework described herein with the regularizer S(f) is applicable for use when the graph G of the input data set is a directed graph as well as when G is an undirected graph except for the use of different representations for the Laplacian matrix L.

Figure 6:
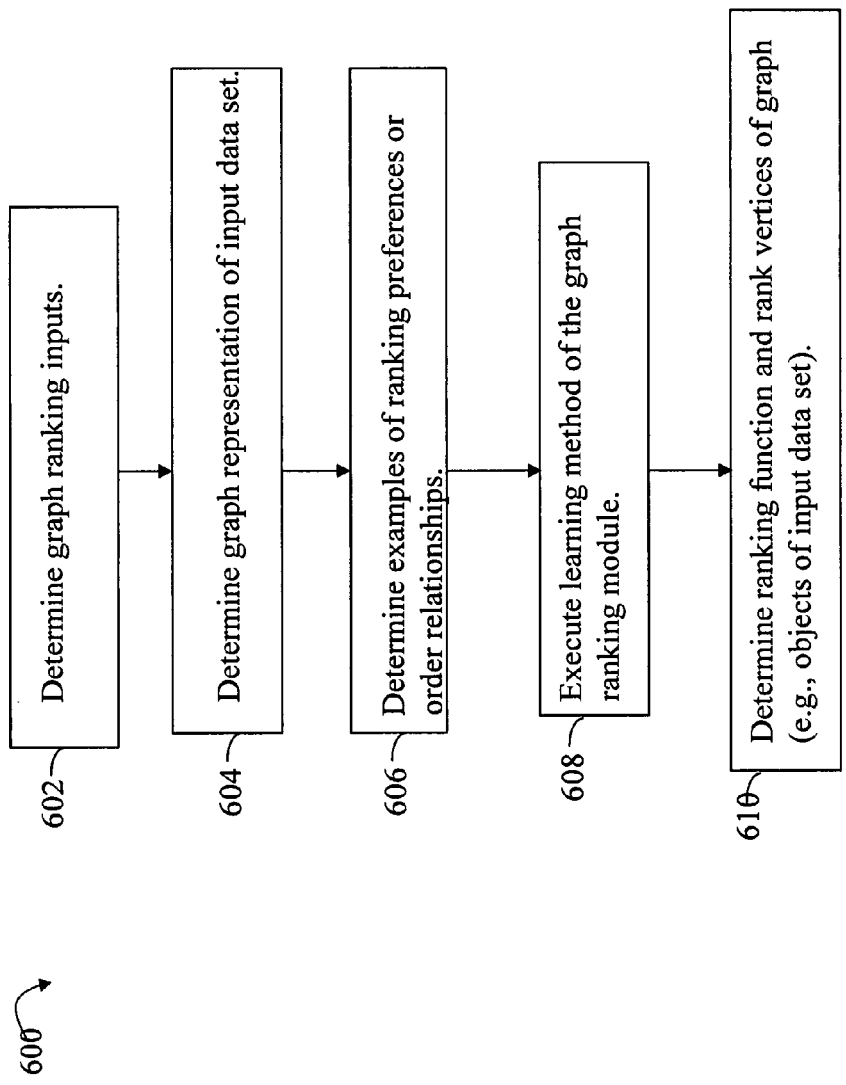
FIGS. 6-7 are flowcharts of processing steps that may be performed in an embodiment using the techniques herein.
Figure 7:
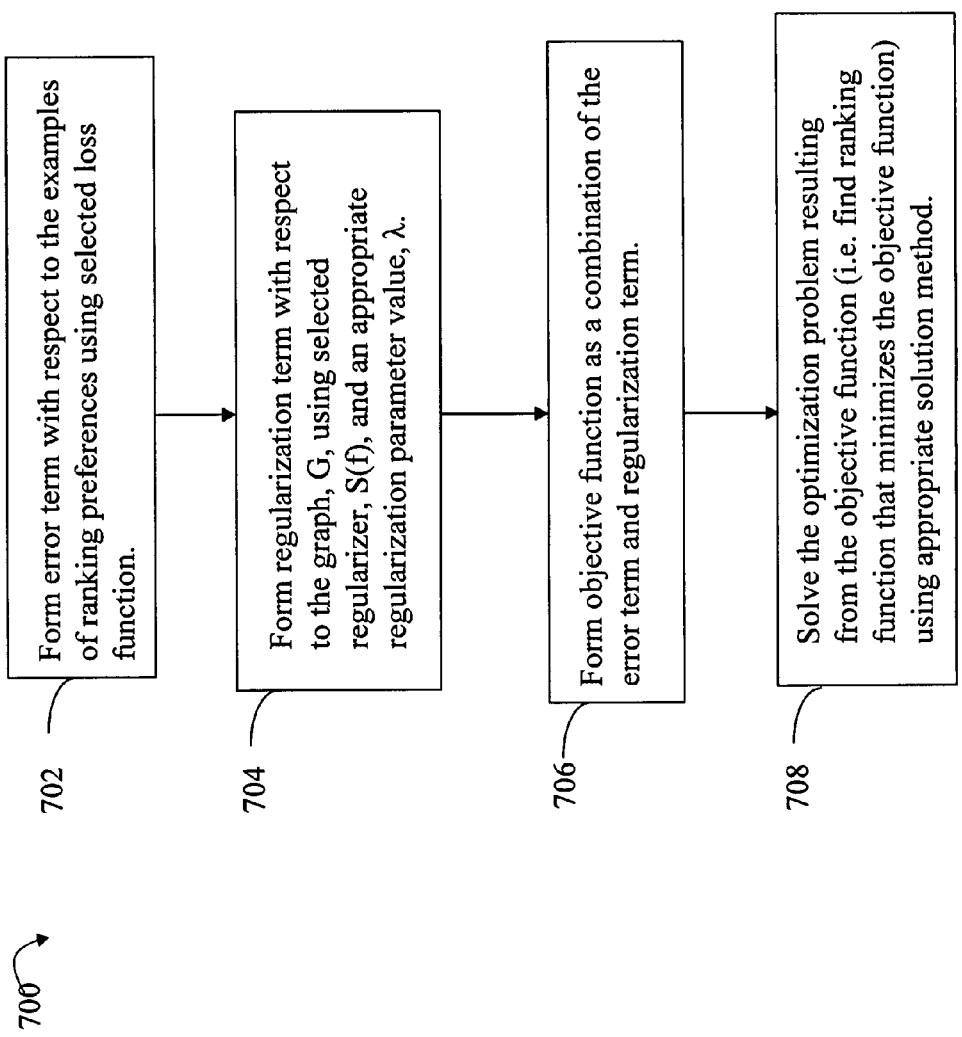

What will now be described in connection with FIGS. 6 and 7 are flowcharts summarizing processing that may be performed in an embodiment utilizing the techniques herein.

Referring to FIG. 6, at step 602, graph ranking inputs are determined. As described herein in an embodiment using a general form of the error term as in EQUATION A, the graph ranking inputs are those selected values for the loss function, $l(f:vi, vj)$, the regularization parameter value, $\lambda$, and regularizer S(f) used by the graph ranking module of an embodiment to learn the ranking function, f, which solves the optimization problem for the given objective function:

$$\min f: V \rightarrow R\{ER\ l(f;\Gamma) + \lambda S(f)\}$$

(i.e., determine the ranking function f minimizing the objective function formed from the regularization term and error term), where ER l(f; $\Gamma$) is the error term formed using the loss function and the penalty values $\tau$ associated with the examples of ranking preferences represented as:

$$ER1(f; \Gamma) = \frac{1}{|\Sigma|} \sum_{(vi,vj) \in \Sigma} \tau(vi, vj) * 1(f : vi, vj).$$

As also described herein, an embodiment may use a general form of the error term of EQUATION A2 in which case the graph ranking inputs would include the selected loss function dependent on vi, vj, and $\tau$ rather than the loss function, l(f:vi, vj), Values of step 602 may be selected for use with one or more different input data sets. In one embodiment, step 602 may be performed, for example, as part of coding the graph ranking module which is executed in a later step 608 to process a graph representing an input data set and examples of ranking preferences.

At step 604, a data graph representing the input data set of objects to be ranked is determined. As described herein, pre-processing or conversion may be performed in order to represent the input data set as a graph, G. At step 606, examples of ranking preferences or order relationships are determined. The examples of ranking preferences rank or order a portion of the objects of the input data set from which the ranking function, f, as described herein, is learned to rank all objects of the input data set. It should be noted that the examples may not be complete with respect to all objects included in the portion. In other words, the examples may not be specified for every combination of vertices in the portion. Steps 604 and 606 may be provided by a user ranking objects of the input data set for a particular application. For a given input data set, the examples of ranking preferences may vary in accordance with the particular application. At step 608, the learning method described herein of the graph ranking module is performed. At step 610, the ranking function, f, which minimizes the objective function is determined and used to rank the vertices of the graph representing the input data set (i.e., rank objects of the input data set). The ranking as output to a user may take any one of a variety of different forms. For example, as an output, the techniques herein may be used to output a ranked or ordered list of objects of the input data set sorted in increasing or decreasing ranking order in accordance with the ranking function f determined. As another example, the techniques herein may be used to output a list of objects as just described with an associated ranking value for each object. An embodiment may also output a list of the function values for each object in the input data set. The list of values may have an ordering in accordance with some known ordering of objects in the input data set to determine a correspondence between an output function value and an object. As another example, an embodiment may output the top K objects, K being an integer greater than 0. For example, a search engine may output for display the highest ranked K objects. K may be a predefined value or a configurable value, for example, set by a user displaying the ranked results.

Referring to FIG. 7, shown is a flowchart describing steps of FIG. 6 in more detail for an given input data set and examples of ranking preferences. The steps of the flowchart 700 describe processing that may be performed using a particular instance of the graph ranking module and selected graph ranking inputs when provided with a graph representing an input data set and examples of ranking preferences. For example, a software product including the graph ranking module may be installed on a computer system. The graph ranking module may utilize selected graph ranking inputs. At some point in time, a user may perform ranking of an input data set of objects and execute code of the software product performing the techniques herein including steps of the flowchart 700. At step 702, the error term is formed with respect to the examples of ranking preferences using the selected loss function. At step 704, the regularization term is formed with respect to the graph, G, representing the input data set, using the selected regularizer S(f) and the regularization parameter value, $\lambda$. At step 706, the objective function is formed as a combination of the error term from step 702 and the regularization term from step 704 for the particular input data set and examples of ranking preferences provided. At step 708, the optimization problem resulting from the objective function is solved. That is, a ranking function is determined that minimizes the objective function using an appropriate solution method. As described herein, the particular method used to solve the optimization problem varies with the particular objective function, complexity, and any reductions applied thereto. As part of step 708, the optimization problem may be solved either exactly or approximately using appropriate techniques.

As described herein for a particular instance of an error term and regularization term, EQUATION D involves minimizing an objective function that is computationally an NP-hard problem so different techniques may be used to reduce the computational complexity of EQUATION D. To reduce the computational complexity, a convex upper bound on the ranking error term is utilized, such as, for example, a convex upper bound obtained by using the hinge ranking loss as described above. The optimization problem in this example may be as represented in EQUATION F which, in the case of the hinge ranking loss, can be reduced to a convex quadratic program and solved using known techniques. The resulting complexity of the objective function may vary with loss function and regularizer selected for use in an embodiment. Thus, different techniques may be applied for solving an instance of the optimization problem for particular terms forming the objective function.

In the foregoing, an embodiment of the techniques herein may utilize inputs in the form of an input data graph, G, and an order graph representing the examples of ranking preferences, $\Gamma$. The order graph may be characterized as representing examples of order relationships among the objects corresponding to the vertices in the data graph. As an output, the techniques herein may be used to generate a ranking over all the vertices, and thus, a ranking for the represented objects. In one embodiment, the ranking may be represented as a real or integer value associated with each object wherein higher values indicate higher ranking positions.

It should be noted that the regularization term of the objective function also contains a regularization parameter, $\lambda$, which may be characterized as a weighting factor for weighting for assigning relative weights to the ranking error term and the regularizer function S(f). A value for $\lambda$ may be selected, for example, using cross validation techniques for the input data.

Described herein are examples of selection of the loss function included in the error term and regularizer that provide for a solvable form of an equation (objective function) used to find the ranking function, f. It will be appreciated by those skilled in the art that variations of the examples described herein may be used in an embodiment. Further details regarding some such variations are described elsewhere herein.

The techniques described herein may perform processing known in the art as transductive learning applicable for use with the known population of graph vertices used in the graphs representing the input data set. The foregoing is in contrast, for example, to other inductive based learning techniques.

The techniques described herein may be used in connection with ranking objects in any application domain in which pair-wise connections (similarities) among objects are of importance and such similarities may be characterized. The techniques herein may be used, for example, to rank molecules, proteins, documents, and the like. With reference to document retrieval, the techniques described herein for ranking may be used to rank documents in a database such that documents relevant to a particular topic or query are ranked higher than other documents having a lesser degree of relevance. In connection with document similarity, a Gaussian similarity measure between documents may be used to determine the edge weights of an undirected similarity graph for representing the input data set of documents. The Gaussian similarity measure used to determine a weight w between vertices vi and vj may be represented as:

$$w(vi,vj)=\exp(-\|xi-xj\|^2)$$

where xi denotes the vector representation of document vi. The vector representation of a document may consist of the counts of selected words, such as the words determined as most frequently occurring in all documents in the input data set. The count values of each vector corresponding to a document may be normalized so as to sum to 1. The techniques described herein for undirected graphs may be used with the selected regularizer and loss function, for example, using the hinge ranking loss and Laplacian-based regularizer.

As another example application, the techniques described herein may be used in connection with drug discovery or cheminformatics. The techniques herein may be used for ranking molecules in a chemical library such that drug-like candidates with a greater chance of success are ranked higher for pre-clinical screening than others with a lower associated success rate. The foregoing provides for a ranking that may result in significant reductions in drug development costs. There are well-defined notions of chemical similarity between molecules. Using such a similarity measure to represent the molecules in a library as a chemical similarity graph, the techniques herein can be applied to learn an appropriate ranking of these molecules. For example, given such a chemical similarity graph and some examples of order relationships among molecules in terms of their activity against a particular target (e.g., examples of molecules that are deemed a success against the target, and examples that are deemed failures against the target), the techniques herein may be used to learn a ranking of the molecules in the library. For example, molecules may be deemed a success or failure with respect to a target in accordance with treatment outcome. The determination may be made, for example, based on chemical structural similarities between elements of the library and those elements associated with various treatment outcomes. Success or failure may also be determined using other techniques such as, for example, being established pharmacologically as blocking a particular pathway, and the like.

The techniques described herein may also be used in connection with other applications such as, for example, financial applications for modeling or prediction, collaborative filtering, and the like.

It should be noted that one skilled in the art may utilize variations of the particular techniques described herein in an embodiment. For example, different loss functions may be used than those described herein. An embodiment may use a different loss function when defining the error term. An embodiment may use other techniques in connection with the foregoing such as, for example, least-squares loss, modified least-squares loss or exponential loss instead of the hinge ranking loss. Additionally, an embodiment may also use a different regularizer such as, for example, an unnormalized Laplacian instead of the normalized Laplacian L of a graph G.

It should be noted that the techniques herein may be used with input data set of varying sizes. As the input data set, and thus the graph G, increases in size, different operations performed using the techniques herein may be computational expensive. For example, performing computations using matrices (e.g., the Laplacian L) associated with G may be computationally expensive. As such, an embodiment using the techniques herein may perform different processing steps to reduce the computation needed in such instances. For example, an embodiment may approximate a graph G for a large data set by a sparse graph using any one of variety of known graph sparsification algorithms, such as, for example, the technique described in D. A. Spielman and S. H. Teng, "Nearly Linear-Time Algorithms for Graph Partitioning, Sparsification, and Solving Linear Systems", Proceedings of the ACM Symposium on Theory of Computing, 2004. A sparse graph representing a larger data set results in a sparse matrix as may be used in connection with a selected regularizer so that the techniques herein may take advantage of specialized matrix operations and/or optimizations.

What will now be described are further examples and uses of the techniques herein for particular applications.

As a first example, the techniques herein may be used in a document retrieval application to rank documents in a database such that documents relevant to a particular topic or query are ranked higher than documents with a lesser degree of relevance. In such an application, the objects to be ranked are documents. The documents may include, for example, text documents (e.g., such as newspapers, articles, books, and the like, or portions thereof). The documents that may be used with the techniques herein may also include multimedia documents containing any combination of text, graphics, audio, and/or video content.

The input data set in such an application may consist of a graph in which there is a vertex corresponding to each document in the database and an edge between each pair of vertices (documents) deemed to be similar according to some document similarity measure, with a corresponding edge weight denoting the degree of similarity. Any one of a variety of different document similarity measures may be used. For example, if the documents are associated with feature vectors, a correlation coefficient between pairs of vectors may be used as the similarity measure. As another example, if the documents are associated with feature vectors, a Gaussian similarity measure may be used that assigns to an edge between vertices vi and vj having a weight w(vi, vj) given by:

$$w(vi,vj) = \exp(-\|xi-xj\|^2)$$

where xi denotes the vector representation of the document vi. The vector representation of a document may include, for example, counts of selected words such as words determined to be the most frequently occurring in all the documents in the input data set. The count values of each vector corresponding to a document may or may not be normalized so as to sum to 1. A document similarity measure may be content-based so that it depends only on the content of the pair of documents compared (e.g., words in the text documents compared, pixels in images compared, and the like). A document similarity measure may also take into account other available information such as, for example, captions for images, known categories of documents, and the like.

In addition to the input data set being represented as a graph in accordance with techniques herein, examples of order relationships or ranking preferences are specified for a portion of the documents in the input data set. These examples may take the form of a list of ordered pairs of documents, the interpretation being that the first document in each pair is to be ranked higher than the second. A penalty value may be associated with each pair of documents in the examples indicating the penalty for misranking the corresponding pair of documents. For example, if the goal of the document retrieval task is to find documents relevant to the topic of airplanes, then examples of ranking preferences include pairs (vi, vj) indicating that document vi is more relevant on this topic than document vj, and for each pair, a corresponding penalty value $\tau(vi, vj)$ denoting the penalty for misranking vi and vj. The penalty value also indicates the degree of preferences of vi over vj. As described herein, the examples of ranking preferences may be specified in a different form, such as real-valued degree of relevance labels for a portion of documents, or partitioning a portion of documents as "relevant" and "not relevant". Examples in forms such as the foregoing may be converted into a pairwise preference form (e.g., vi, vj) with an associated penalty value by performing preprocessing to convert from one form to the pairwise preference form.

Given the input data set of documents represented as a graph and examples of ranking preferences among portion of the documents as described above, the techniques herein may be used to learn a ranking function that ranks all the vertices (documents) in the input data set. Any one of a variety of loss function and regularizer may be used (e.g., the hinge ranking loss function and the Laplacian-based regularizer described above).

As another example, the techniques herein may be used in a web-search application to rank web pages in a collection such that webpages most relevant to a query are ranked higher than other webpages having a lesser degree of relevance. In such an application, the objects to be ranked are webpages.

The input data set in this example may be represented as a graph having a vertex corresponding to each webpage in the collection and an edge between each pair of vertices (webpages) deemed to be similar according to some webpage similarity measure, with a corresponding weight edge denoting the degree of similarity. Any of a variety of different similarity measures may be used that take into account the webpage content, metadata content, hyperlink information, and the like.

In addition to the input data set represented as a graph, examples of order relationships or ranking preferences are provided for a portion of webpages in the input data set. These examples may take the form of a list of pairs of vertices as described herein in which each pair includes two vertices, vi, vj, indicating that vi should be ranked higher than vj. Associated with each pair is a penalty value for misordering the pair. The examples may be in a form other than the pairwise form and may be converted into the pairwise form using appropriate preprocessing. With the web-search application, the examples of ranking preferences may also be provided implicitly. For example, if an existing search engine is first used to obtain a ranking of webpages according to some query, and the user then selects the first, $3^{rd}$ and $10^{th}$ webpages in a returned list of webpages, it may be inferred that the user preferred the $3^{rd}$ webpage over the second webpage in the list, the $10^{th}$ over the second, $4^{th}$, $5^{th}$, and so on, in the list. In other words, the examples of ranking preferences may be inferred from user selection or action where the selected web pages are deemed to be preferred or more relevant over those other webpages included in the list which have not been selected. The inferred examples of ranking preferences may then be used to obtain the examples of ranking preferences more in line with a particular user's preferences for the query terms.

Given the input data set of webpages represented as a graph and examples of ranking preferences among portion of the webpages as described above, the techniques herein may be used to learn a ranking function that ranks all the vertices (webpages) in the input data set. Any one of a variety of loss function and regularizer may be used (e.g., the hinge ranking loss function and the Laplacian-based regularizer described above).

As another example, the techniques herein may be used in a recommender system application to rank products in a database (e.g., books, movies, electronic items, etc.) that are candidates for recommendation to a user such that products likely to be of interest to a user are ranked higher than other products likely to be of lesser interest. In such an application, the objects to be ranked are the products that are candidates for recommendation.

The input data set in such an application may consist of a graph in which there is a vertex corresponding to each product and an edge between each pair of vertices (products) deemed to be similar according to some product similarity measure, with a corresponding edge weight denoting the degree of similarity. Any one of a variety of different product similarity measures may be used. The particular similarity measure may vary with the products being compared and may take into account different attributes of the products. For example, the similarity measure may take into account information such as subject and/or author for books, genre, director, and/or actors for movies, brand and/or functionality for electronic items, prices, and the like. In the case of a recommender system, a collaborative filtering approach may be used: two products may be considered similar or related if they have been previously purchased together by the same customers.

In addition to the input data set represented as a graph, examples of order relationships or ranking preferences are provided for a portion of the products in the input data set. These examples may take the form of a list of pairs of vertices as described herein in which each pair includes two vertices, vi, vj, indicating that vi should be ranked higher than vj. Associated with each pair is a penalty value for misordering the pair of products. The examples may be in a form other than the pairwise form and may be converted into the pairwise form using appropriate preprocessing. For recommender systems, the examples of ranking preferences may be obtained, for example, by directly questioning a user about his/her preferences, may be inferred implicitly from a user's past behavior, and the like. In connection with inferring the examples from a user's activities or behavior, a user may view product vi but finally purchased product vj. In this case, it may be inferred that the user had a preference (strong) for vj over vi. Similarly, if a user spends more time viewing product vi than product vk, it may be inferred that the viewer had a preference (mild) for vi over vk.

Given the input data set of products represented as a graph and examples of ranking preferences among portion of the products as described above, the techniques herein may be used to learn a ranking function that ranks all the vertices (products) in the input data set. Any one of a variety of loss function and regularizer may be used (e.g., the hinge ranking loss function and the Laplacian-based regularizer described above). With recommender systems, the output presented to a user may be in the form of a list of the top K products in the learned ranking, for some small number K. In this case, it may be useful to utilize an error term that focuses on the quality near the top of the learned ranking. Such an error term can then be used in conjunction with any graph-based regularizer, such as the Laplacian-based regularizer described herein.

As another example, the techniques herein may be used in a cheminfomatics or drug discovery application. In such an application, the techniques herein may be used to rank molecules included in a chemical library such that drug-like candidates with a greater chance of success are ranked higher for preclinical screening than others with a lower chance of success. This provides for a ranking that may result in significant reductions in drug development costs. In such an application, the objects to be ranked are molecules, including proteins and chemical compounds.

The input data set in such an application may consist of a graph in which there is a vertex corresponding to each molecule and an edge between each pair of vertices (molecules) deemed to be similar according to some chemical similarity measure, with a corresponding edge weight denoting the degree of similarity. Any one of a variety of different chemical similarity measures may be used. For example, there are a variety of well defined notions of chemical similarity between molecules that take into account, for example, 2D/3D structure and conformation of the molecules compared, the absence/presences of various features, molecular fields, and the like. Any such similarity measure may be used.

In addition to the input data set represented as a graph, examples of order relationships or ranking preferences are provided for a portion of the molecules in the input data set. These examples may take the form of a list of pairs of vertices as described herein in which each pair includes two vertices, (vi, vj), indicating that vi should be ranked higher than vj. Associated with each pair is a penalty value for misordering the pair of molecules. For example, if the goal of the drug discovery task is to find drugs that can treat a particular form of cancer and molecule vi is know to block a pathway involved in the development of that cancer while molecule vj is know to promote it, then the pair (vi, vj) may form an example of a ranking preference together with some appropriate penalty value. As with other exemplary applications and uses of the techniques herein, the examples of ranking preferences may be provided in a different form than the pairwise form with an associated penalty value for misordering each pair of vertices in the examples. For examples, a real-valued label ai may be provided for each vertex (molecule) in a portion of the input data set such that ai corresponds to some measure of biological activity of vi relevant to the task. ai may be a binding affinity of molecule vi to a receptor that is useful in blocking a pathway involved in the disease being targeted. As another form of the examples, a portion of the molecules may be partitioned into different activity levels. As described herein, such examples in a first form may be converted into a pairwise form (e.g., pairs of vertices and associating a penalty value with each pair) by preprocessing.

Given the input data set of molecules represented as a graph and examples of ranking preferences among a portion of the molecules as described above, the techniques herein may be used to learn a ranking function that ranks all the vertices (molecules) in the input data set. Any one of a variety of loss function and regularizer may be used (e.g., the hinge ranking loss function and the Laplacian-based regularizer described above).

The techniques herein may also be used in connection with a bioinformatics application to rank a set of genes such that genes which are relevant to a given disease or condition are ranked higher than genes that are less relevant. The foregoing provides for a ranking that may assist in identifying genes that play an important role in a given disease or condition. In such an application, the objects to be ranked are genes.

The input data set in such an application may consist of a graph in which there is a vertex corresponding to each gene and an edge between each pair of vertices (genes) deemed to be similar according to some gene similarity measure, with a corresponding edge weight denoting the degree of similarity. Any one of a variety of different gene similarity measures may be used. For example, a sequence similarity measure may be applied to the DNA sequences corresponding to two genes being compared. As another example, a similarity measure may be based on measurements of various properties of genes relevant to the disease/condition being studied (e.g., measurements of gene expression in tissues corresponding to diseased and normal states, or in various chemical or biological processes).

In addition to the input data set represented as a graph, examples of order relationships or ranking preferences are provided for a portion of the genes in the input data set. These examples may take the form of a list of pairs of vertices as described herein in which each pair includes two vertices, (vi, vj), indicating that vi should be ranked higher than vj. Associated with each pair is a penalty value for misordering the pair of genes. For example, if the goal of the bioinformatics study is to identify new genes that play an important role in the development of a given disease or condition, and gene vi is known (such as from literature or previous studies) to be involved in the development of this disease or some related condition, while gene vj is known to have an unrelated function, then the pair (vi, vj) may form an example of a ranking preference where vi is ranked higher than vj. Associated with the pair is a penalty value for misordering the vertices of the pair. It should be note that the examples of ranking preferences may be provided in a different form other than the pairwise examples of vertices with associated penalty values. For example, each gene in some portion of the input data set may be labeled by a real-valued number denoting the degree of relevance to the disease or condition being studied. As another example, the genes in the portion may be partitioned as being relevant or not relevant. As described herein, such examples can be converted into the pairwise form with associated penalty values by preprocessing.

Given the input data set of genes represented as a graph and examples of ranking preferences among a portion of the genes as described above, the techniques herein may be used to learn a ranking function that ranks all the vertices (genes) in the input data set. Any one of a variety of loss function and regularizer may be used (e.g., the hinge ranking loss function and the Laplacian-based regularizer described above).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for ranking a data set of objects comprising:
providing a graph representing the data set;
providing examples of ranking preferences for a portion of objects in the data set, each of said examples identifying a pair of objects of the portion, the pair of objects indicating a ranking preference of a first object of the pair with respect to the second object of the pair, said each example indicating that the first object of the pair is ranked higher than the second object of the pair, wherein penalty values are specified for said examples, one of said penalty values being specified for each of said examples wherein the one of the penalty values for said each example indicates a penalty value for improperly ordering the pair of objects of said each example, a first of the penalty values for a first of said examples specifying a first value that is different than a second value specified as a second of the penalty values for a second of said examples, wherein an allowable value for each of the penalty values includes any real value;
determining, using inputs including said examples and the penalty values specified for said examples, a function, f, that ranks the objects of the data set; and
determining a ranking of the objects of the data set using said function, f, wherein at least one of said providing a graph, said providing examples, said determining a function and said determining a ranking are performed using a processor.

2. The method of claim 1, wherein said function, f, minimizes an objective function.

3. The method of claim 2, wherein said objective function is formed using an error term and a regularization term.

4. The method of claim 3, wherein said error term includes a loss function and is determined using penalty values associated with the examples.

5. The method of claim 3, wherein said regularization term is formed using a regularizer determined from the graph of the input data set and regularization parameter value used to weight the regularization term in accordance with said error term.

6. The method of claim 2, wherein said graph includes a set of vertices corresponding to the objects, a set of edges where each of said edges represents a similarity between two vertices connected by said each edge, and a set of weights where each of said weights is associated with one of said edges and represents a degree of similarity between two vertices connected by said one edge.

7. The method of claim 6, wherein said graph is an undirected graph and said objective function includes a regularizer formed using a Laplacian matrix of the graph representing the data set of objects.

8. The method of claim 7, wherein said objective function includes an error term formed using penalty values associated with said examples and using a convex upper bound of a step-loss function, l(f:vi, vj), wherein, for one of said examples indicating that a vertex vi of the graph is ranked higher than vertex vj, the step-loss function l(f:vi, vj), for the pair of vertices, vi, vj, is 1 if f(vi)<f(vj), ½ if f(vi)=f(vj), or 0 if f(vi)>f(vj).

9. The method of claim 8, wherein, said objective function uses a convex upper bound on the step-loss function of the error term represented as:

$$lh(f:vi,vj)=(1-(f(vi)-f(vj)))_+$$

where, if $(1-(f(vi)-f(vj)))>0$, then lh (f:vi, vj)=$(1-(f(vi)-f(vj)))$, and otherwise, lh (f:vi, vj)=0.

10. The method of claim 6, wherein said graph is a directed graph and said objective function includes a regularization term formed using a Laplacian of the graph determined using a transitional probability matrix.

11. The method of claim 1, wherein said data set is a set of documents.

12. The method of claim 11, wherein the documents are ranked in accordance with one or more query terms.

13. The method of claim 11, wherein the documents include multimedia documents.

14. The method of claim 1, wherein said data set is a set of molecules ranked according to biological activity with respect to a particular target.

15. The method of claim 14, wherein the molecules include chemical structures.

16. The method of claim 6, wherein said graph of the data set is a data graph, and said examples are represented as an order graph, said order graph being a directed graph formed from a subset of vertices of said data graph, edges and weights, each of said edges from a first vertex of said subset to a second vertex of said subset indicating that said first vertex is ranked higher than said second vertex, each of said weights corresponding to one of said edges and indicating a penalty value for improperly ordering said first vertex and said second vertex of said one edge.

17. The method of claim 1, wherein a different one of the penalty values is specified for each of the examples.

18. A method for ranking a data set of objects comprising:
providing a graph representing similarity between pairs of the objects of the data set, said graph including vertices corresponding to the objects, said graph including edges, each of said edges between a pair of vertices having a weight corresponding to a similarity measurement between objects that correspond to the pair of vertices;
providing examples of ranking preferences for a portion of objects in the data set, each of said examples identifying a pair of objects of the portion, the pair of objects indicating a ranking preference of a first object of the pair with respect to a second object of the pair, wherein penalty values are specified for said examples, one of said penalty values being specified for each of said examples wherein the one of the penalty values for said each example indicates a penalty value for improperly ordering the pair of objects of said each example, a first of the penalty values for a first of said examples specifying a first value that is different than a second value specified as a second of the penalty values for a second of said examples, wherein an allowable value for each of the penalty values includes any real value;
determining, using inputs including said examples and the penalty values specified for said examples, a function, f, that minimizes an objective function, said objective function including an error term and a regularization term, said error term being formed from a loss function and penalty values associated with improperly ranking pairs of objects included in said examples, said regularization term formed using a weighting factor and a regularizer that provides a measurement of how smooth the function f is with respect to ranking a pair of objects in accordance with their respective similarity; and
outputting a ranking of said objects in the data set using said function, f, wherein at least one of said providing a graph, said providing examples, said determining a function and said outputting a ranking are performed using a processor.

19. The method of claim 18, wherein said regularizer is formed using a Laplacian Matrix of the graph.

20. The method of claim 19, wherein said graph is a directed graph and the Laplacian matrix is formed using a transition probability matrix.

21. The method of claim 19, wherein said graph is an undirected graph and the Laplacian matrix, L, is represented as:

$$L = D^{-1/2}(D-W)D^{-1/2}$$

where D is a diagonal matrix and W is an "n×n" matrix, n=a number of vertices in the graph, with entry $W_{ij}=w(v_i, v_j)$ for all edges $\{v_i, v_j\}$ of the graph, $W_{ij}=0$ otherwise, $w(v_i, v_j)$ representing a weight associated with an edge between vertex $v_i$ and vertex $v_j$ in the graph, and D is a diagonal matrix with entry $D_{ii}=d(v_i)$, $w(v_i, v_j)$ being the weight of the edge between vertices $v_i$ and $v_j$ of the graph.

22. The method of claim 19, wherein said regularization term include a regularizer S(f) represented as:

$$S(f) = F^T L F$$

where L represents the Laplacian matrix of the graph, F is a column vector of ranking function values for each of the vertices in the graph, and $F^T$ is a transpose of the column vector F.

23. The method of claim 18, wherein the examples of ranking preferences are specified using one of a real value assigned to each object in the portion or a partitioning of the objects in the portion into a first partition of relevant objects and a second partition of objects which are not relevant.

24. The method of claim 18, further comprising:
preprocessing a first form of the examples of ranking preferences to convert the first form into a second form including pairs of vertices and an associated one of said penalty values with each of said pairs, said penalty value indicating a penalty incurred for misordering vertices of said each pair.

25. The method of claim 18, wherein said data set is a set formed from webpages, products, or genes.

26. A non-transitory computer readable medium comprising code stored thereon for ranking a data set of objects, the computer readable medium comprising code for:
providing a graph representing similarity between pairs of the objects of the data set, said graph including vertices corresponding to the objects, said graph including edges, each of said edges between a pair of vertices having a weight corresponding to a similarity measurement between objects that correspond to the pair of vertices;
providing examples of ranking preferences for a portion of objects in the data set, each of said examples identifying a pair of objects of the portion, the pair of objects indicating a ranking preference of a first object of the pair with respect to a second object of the pair, wherein penalty values are specified for said examples, one of said penalty values being specified for each of said examples wherein the one of the penalty values for said each example indicates a penalty value for improperly ordering the pair of objects of said each example, a first of the penalty values for a first of said examples specifying a first value that is different than a second value specified as a second of the penalty values for a second of said examples, wherein an allowable value for each of the penalty values includes any real value;
determining, using inputs including said examples and the penalty values specified for said examples, a function, f, that minimizes an objective function, said objective function including an error term and a regularization term, said error term being formed from a loss function and the penalty values associated with improperly ranking pairs of objects included in said examples, said regularization term formed using a weighting factor and a regularizer that provides a measurement of how smooth the function f is with respect to ranking a pair of objects in accordance with their respective similarity; and
outputting a ranking of said objects in the data set using said function, f.

27. A nontransitory computer readable medium comprising code for ranking a data set of objects, the nontransitory computer readable medium comprising code for:

providing a graph representing the data set;
providing examples of ranking preferences for a portion of objects in the data set, each of said examples identifying a pair of objects of the portion, the pair of objects indicating a ranking preference of a first object of the pair with respect to the second object of the pair, said each example indicating that the first object of the pair is ranked higher than the second object of the pair, wherein penalty values are specified for said examples, one of said penalty values being specified for each of said examples wherein the one of the penalty values for said each example indicates a penalty value for improperly ordering the pair of objects of said each example, a first of the penalty values for a first of said examples specifying a first value that is different than a second value specified as a second of the penalty values for a second of said examples, wherein an allowable value for each of the penalty values includes any real value;

determining, using inputs including said examples and the penalty values specified for said examples, a function, f, that ranks the objects of the data set; and determining a ranking of the objects of the data set using said function, f, wherein at least one of said providing a graph, said providing examples, said determining a function and said determining a ranking are performed using a processor.

* * * * *